United States Patent
Laddha et al.

(10) Patent No.: US 11,762,094 B2
(45) Date of Patent: Sep. 19, 2023

(54) SYSTEMS AND METHODS FOR OBJECT DETECTION AND MOTION PREDICTION BY FUSING MULTIPLE SENSOR SWEEPS INTO A RANGE VIEW REPRESENTATION

(71) Applicant: UATC, LLC, San Francisco, CA (US)

(72) Inventors: Ankit Laddha, Pittsburgh, PA (US); Gregory P. Meyer, Pittsburgh, PA (US); Jake Scott Charland, Winter Park, CO (US); Shivam Gautam, Pittsburgh, PA (US); Shreyash Pandey, Pittsburgh, PA (US); Carlos Vallespi-Gonzalez, Wexford, PA (US); Carl Knox Wellington, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 363 days.

(21) Appl. No.: 17/091,577

(22) Filed: Nov. 6, 2020

(65) Prior Publication Data

US 2021/0278539 A1   Sep. 9, 2021

Related U.S. Application Data

(60) Provisional application No. 63/104,146, filed on Oct. 22, 2020, provisional application No. 63/017,930,
(Continued)

(51) Int. Cl.
*G01S 17/58* (2006.01)
*G01S 17/89* (2020.01)
(Continued)

(52) U.S. Cl.
CPC ......... *G01S 17/58* (2013.01); *B60W 50/0097* (2013.01); *B60W 60/0027* (2020.02);
(Continued)

(58) Field of Classification Search
CPC ........ G01S 17/58; G01S 17/931; G01S 17/89; B60W 60/0027; B60W 50/0097;
(Continued)

(56) References Cited

U.S. PATENT DOCUMENTS

2010/0017046 A1* 1/2010 Cheung ............... G05D 1/0094
701/2
2018/0348346 A1* 12/2018 Vallespi-Gonzalez ......................
G06V 10/82

FOREIGN PATENT DOCUMENTS

CN       110223379 A       9/2019

OTHER PUBLICATIONS

Alahi et al., "Social LSTM: Human Trajectory Prediction in Crowded Spaces", Conference on Computer Vision and Pattern Recognition, Jun. 26-Jul. 1, 2016, Las Vegas. NV, 11 pages.
(Continued)

*Primary Examiner* — Mahmoud S Ismail
(74) *Attorney, Agent, or Firm* — Dority & Manning, P.A.

(57) ABSTRACT

Systems and methods for detecting objects and predicting their motion are provided. In particular, a computing system can obtain a plurality of sensor sweeps. The computing system can determine movement data associated with movement of the autonomous vehicle. For each sensor sweep, the computing system can generate an image associated with the sensor sweep. The computing system can extract, using the respective image as input to one or more machine-learned models, feature data from the respective image. The computing system can transform the feature data into a coordinate frame associated with a next time step. The computing system can generate a fused image. The computing system can generate a final fused image. The computing system can predict, based, at least in part, on the final fused representation of the plurality of sensors sweeps from the plurality of
(Continued)

sensor sweeps, movement associated with the feature data at one or more time steps in the future.

20 Claims, 10 Drawing Sheets

Related U.S. Application Data filed on Apr. 30, 2020, provisional application No. 62/985,583, filed on Mar. 5, 2020.

(51) Int. Cl.
| | |
|---|---|
| *G05D 1/00* | (2006.01) |
| *G01S 17/931* | (2020.01) |
| *B60W 60/00* | (2020.01) |
| *G06N 3/08* | (2023.01) |
| *B60W 50/00* | (2006.01) |
| *B60W 30/095* | (2012.01) |
| *B60W 30/09* | (2012.01) |

(52) U.S. Cl.
CPC ............ *G01S 17/89* (2013.01); *G01S 17/931* (2020.01); *G05D 1/0088* (2013.01); *G06N 3/08* (2013.01); *B60W 30/09* (2013.01); *B60W 30/0956* (2013.01); *B60W 2420/52* (2013.01); *G05D 2201/0213* (2013.01)

(58) Field of Classification Search
CPC ............ B60W 30/09; B60W 30/0956; B60W 2420/52; G05D 1/0088; G05D 2201/0213; G06N 3/08
USPC .......................................................... 701/25
See application file for complete search history.

(56) References Cited

OTHER PUBLICATIONS

Bansal et al., "ChauffeurNet: Learning to Drive by Imitating the Best and Synthesizing the Worst", arXiv:1812.03079v1, Dec. 7, 2018, 20 pages.
Bengio et al., "Curriculum Learning", International Conference on Machine Learning, Jun. 14-18, 2009, Montreal, Quebec, 8 pages.
Caesar et al., "nuScenes: A multimodal dataset for autonomous driving", arXiv:1903.11027v3, Nov. 22, 2019, 16 pages.
Casas et al., "IntentNet: Learning to Predict Intention from Raw Sensor Data", Conference on Robot Learning, Oct. 29-31, 2018, Zurich, Switzerland, 10 pages.
Casas et al., "SPAGNN: Spatially-Aware Graph Neural Networks for Relational Behavior Forecasting from Sensor Data", arXiv:1910.08233v1, Oct. 18, 2019, 11 pages.
Chai et al., "MuitiPath: Multiple Probabilistic Anchor Trajectory Hypotheses for Behavior Prediction", arXiv:1910.05449v1, Oct. 12, 2019, 14 pages.
Chen et al., "Multi-View 3D Object Detection Network for Autonomous Driving", Conference on Computer Vision and Pattern Recognition, Jul. 21-26, 2017, Honolulu, Hawaii, pp. 1907-1915.
Cui et al., "Multimodal Trajectory Predictions for Autonomous Driving using Deep Convolutional Networks", arXiv:1809.10732v2, Mar. 1, 2019, 7 pages.
Deo et al., "Convolutional Social Pooling for Vehicle Trajectory Prediction", Conference on Computer Vision and Pattern Recognition, Jun. 18-22, 2018, Salt Lake City, Utah, pp. 1581-1589.
Djuric et al., "Short-term Motion Prediction of Traffic Actors for Autonomous Driving using Deep Convolutional Networks", arXiv:1808.05819v2, Sep. 16, 2018, 7 pages.
Einhorn et al., "Finding the Adequate Resolution for Grid Mapping—Cell Sizes Locally Adapting On-the-Fly", International Conference on Robotics and Automation, May 9-13, 2011, Shanghai, China, 6 pages.
Gautam et al., "SDVTracker: Real-Time Multi-Sensor Association and Tracking for Self-Driving Vehicles", arXiv:2003.04447v1, Mar. 9, 2020, 8 pages.
Hoermann et al., "Dynamic Occupancy Grid Prediction for Urban Autonomous Driving: A Deep Learning Approach with Fully Automatic Labeling", arXiv:1705.08781v2, Nov. 7, 2017, 8 pages.
Hong et al., "Rules of the Road: Predicting Driving Behavior with a Convolutional Model of Semantic Interactions", Conference on Computer Vision and Pattern Recognition, Jun. 16-20, 2019, Long Beach, CA, pp. 8454-8462.
International Search Report and Written Opinion for Application No. PCT/US2021/020644, dated May 31, 2021, 17 pages.
Lang et al., "PointPillars: Fast Encoders for Object Detection from Point Clouds", Conference on Computer Vision and Pattern Recognition, Jun. 13-18, 2010, San Francisco, CA, pp. 12697-12705.
Lee et al., "Desire: Distant Future Prediction in Dynamic Scenes with Interacting Agents", Conference on Computer Vision and Pattern Recognition, Jul. 21-26, 2017, Honolulu, Hawaii, 10 pages.
Li et al., "Vehicle Detection from 3D Lidar Using Fully Convolutional Network", Proceedings of Robotics: Science and Systems, Jun. 2016, 8 pages.
Lin et al., "Focal Loss for Dense Object Detection", International Conference on Computer Vision, Oct. 22-29, 2017, Venice, Italy, pp. 2980-2988.
Luo et al., "Fast and Furious: Real Time End-to-End 3D Detection, Tracking and Motion Forecasting with a Single Convolutional Net", Conference on Computer Vision and Pattern Recognition, Jun. 18-22, 2018, Salt Lake City, Utah, 9 pages.
Malla et al., "Titan: Future Forecast using Action Priors", arXiv:2003.13886v3, Aug. 6, 2020, 19 pages.
Meyer et al., "LaserNet: An Efficient Probabilistic 3D Object Detector for Autonomous Driving", Conference on Computer Vision and Pattern Recognition, Jun. 16-20, 2019, Long Beach, CA, pp. 12677-12686.
Meyer et al., "Learning an Uncertainty-Aware Object Detector for Autonomous Driving", arXiv:1910.11375v1, Oct. 24, 2019, 7 pages.
Meyer et al., "Sensor Fusion for Joint 3D Object Detection and Semantic Segmentation", Conference on Computer Vision and Pattern Recognition, Jun. 16-20, 2019, Long Beach, CA, 8 pages.
Meyer et. al. "LaserFlow: Efficient and Probabilistic Object Detection and Motion Forecasting", arXiv:2003.05982v1, Mar. 12, 2020, 24 pages.
Meyer, "An Alternative Probabilistic Interpretation of the Huber Loss", arXiv:1911.02088v1, Nov. 5, 2019, 12 pages.
Milan et al., "Online Multi-Target Tracking Using Recurrent Neural Networks", AAAI Conference on Artificial Intelligence, Feb. 4-9, 2017, San Francisco, CA, pp. 4225-4232.
Mohajerin et al., "Multi-Step Prediction of Occupancy Grid Maps with Recurrent Neural Networks", Conference on Computer Vision and Pattern Recognition, Jun. 16-20, 2019, Long Beach, CA, pp. 10600-10608.
Ngiam et al., "StarNet: Targeted Computation for Object Detection in Point Clouds", arXiv:1908.11069v3, Dec. 2, 2019, 12 pages.
Ronneberger et al., "U-Net: Convolutional Networks for Biomedical Image Sepmentation", Conference on Medical Image Computing and Computer-Assisted Intervention, Oct. 5-9, 2015, Munich, Germany, pp. 234-241.
Sadeghian et al., "CAR-Net: Clairvoyant Attentive Recurrent Network", European Conference on Computer Vision, Sep. 8-14, 2018, Munich, Germany, 17 pages.
Sadeghian et al., "SoPhie: An Attentive GAN for Predicting Paths Compliant to Social and Physical Constraints", Conference on Computer Vision and Pattern Recognition. Jun. 16-20, 2019, Long Beach, CA, pp. 1349-1358.
Sadeghian et al., "Tracking the Untrackable: Learning to Track Multiple Cues with Long-Term Dependencies", International Conference on Computer Vision, Oct. 22-29, 2017, Venice, Italy, pp. 300-311.
Schreiber et al., "Long-Term Occupancy Grid Prediction Using Recurrent Neural Networks," arXiv:1809.03782v2, Jun. 7, 2019, 8 pages.

(56) References Cited

OTHER PUBLICATIONS

Schulter et al., "Deep Network Flow for Multi-Object Tracking", Conference on Computer Vision and Pattern Recognition, Jul. 22-25, 2017, Honolulu, Hawaii, pp. 6951-6960.

Shi et al., "PointRCNN: 3D Object Proposal Generation and Detection from Point Cloud", Conference on Computer Vision and Pattern Recognition, Jun. 16-20, 2019, Long Beach, CA, pp. 770-779.

Tang et al., "Multiple Futures Prediction", Conference on Neural Information Processing Systems, Dec. 8-14, 2019, Vancouver, Canada, 11 pages.

Van Der Merwe et al., "Sigma-Point Kalman Filters for Integrated Navigation", Proceedings of the 60th Annual Meeting of the Institute of Navigation, Jun. 7-9, 2004, Dayton, OH, 14 pages.

Vemula et al., "Social Attention: Modeling Attention in Human Crowds", IEEE International Conference on Robotics and Automation, May 21-26, 2018, Brisbane, Australia, 22 pages.

Yan et al., "SECOND: Sparsely Embedded Convolutional Detection", Sensors, vol. 18, Oct. 6, 2018, 17 pages.

Yang et al., "Pixor: Real-time 3D Object Detection from Point Clouds", Conference on Computer Vision and Pattern Recognition, Jun. 18-22, 2018, Salt Lake City, Utah, pp. 7652-7660.

Yang et al., "STD: Sparse-to-Dense 3D Object Detector for Point Cloud", International Conference on Computer Vision, Oct. 27-Nov. 2, 2019, Seoul, Korea, pp. 1951-1960.

Zeng et al., "End-to-end Interpretable Neural Motion Planner", Conference on Computer Vision and Pattern Recognition, Jun. 16-20, 2019, Long Beach, CA, pp. 8660-8669.

Zhao et al., "Multi-Agent Tensor Fusion for Contextual Trajectory Prediction", Conference on Computer Vision and Pattern Recognition, Jun. 16-20, 2019, Long Beach, CA, pp. 12126-12134.

Zhou et al., "End-to-End Multi-View Fusion for 3D Object Detection in LiDAR Point Clouds", Conference on Robot Learning, Oct. 30-Nov. 1, 2019, Osaka, Japan, 10 pages.

Zhou et al., "VoxelNet: End-to-End Learning for Point Cloud Based 3D Object Detection", Conference on Computer Vision and Pattern Recognition, Jun. 18-22, 2018, Salt Lake City, Utah, 10 pages.

\* cited by examiner

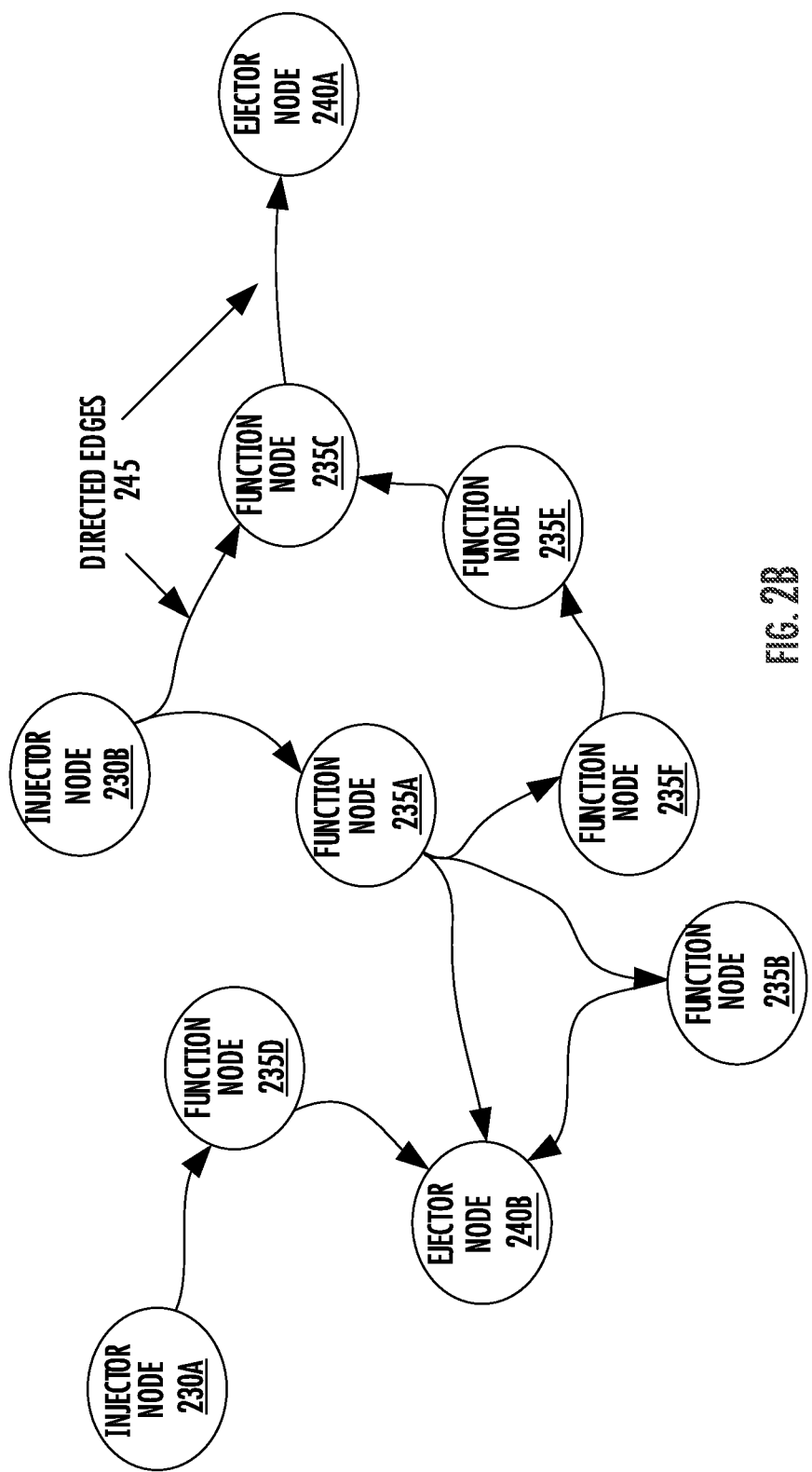

SYSTEMS AND METHODS FOR OBJECT DETECTION AND MOTION PREDICTION BY FUSING MULTIPLE SENSOR SWEEPS INTO A RANGE VIEW REPRESENTATION

RELATED APPLICATION

This application claims priority to and the benefit of U.S. Provisional Patent Application No. 62/985,583, filed Mar. 5, 2020, U.S. Provisional Patent Application No. 63/017,930, filed Apr. 30, 2020, and U.S. Provisional Patent Application No. 63/104,146, filed Oct. 22, 2020 which are hereby incorporated by reference in its entirety.

FIELD

The present disclosure relates generally to autonomous vehicles. More particularly, the present disclosure relates to control systems for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system with one or more processors, a plurality of sensor sweeps from a sensor associated with an autonomous vehicle, each sensor sweep being associated with a time step between a current point in time and a past point in time. The method can include determining, by the computing system, movement data associated with movement of the autonomous vehicle from the past point in time to the current point in time. The method can include, for each respective sensor sweep in the plurality of sensor sweeps, beginning with the least recent sensor sweep in the plurality of sensor sweeps and repeating with each subsequent sensor sweep until the most recent sensor sweep, generating, by the computing system and based on the respective sensor sweep, a respective image associated with the respective sensor sweep, the respective image comprising sensor data included in the respective sensor sweep arranged in a two-dimensional representation. The method can include extracting, by the computing system using the respective image as input to one or more machine-learned models, feature data from the respective image. The method can include transforming, by the computing system, the feature data into a coordinate frame associated with a next time step. The method can include mapping, by the computing system, each point from the respective image to the image associated with the next time step to generate a fused image. The method can include generating, by the computing system, a final fused representation of the plurality of sensors sweeps once a sensor sweep associated with the current time step has been combined with all previously generated sensor sweeps. The method can include predicting, by the computing system based, at least in part, on the final fused representation of the plurality of sensors sweeps from the plurality of sensor sweeps, movement associated with the feature data at one or more time steps in the future.

Yet another example aspect of the present disclosure is directed to an autonomous vehicle. The autonomous vehicle can obtain a plurality of sensor sweeps from a sensor associated with the autonomous vehicle, each sensor sweep representing a time step between a current point in time and a past point in time. The autonomous vehicle can determine movement data associated with movement of the autonomous vehicle from the past time to the current time. The autonomous vehicle can, for each respective sensor sweep in the plurality of sensor sweeps, beginning with the least recent sensor sweep and repeating until the sensor sweep associated with the current time, generate a respective image, the respective image comprising sensor data included in the respective sensor sweep arranged in a two-dimensional representation. The autonomous vehicle can extract feature data using the respective image as input to one or more machine-learned models, feature data from the respective image. The autonomous vehicle can transform the feature data into a coordinate frame associated with a next time step. The autonomous vehicle can map each point from the respective image to the image associated with the next time step to generate a fused image. The autonomous vehicle can generate a final fused representation of the plurality of sensors sweeps once a sensor sweep associated with the current time step has been combined with all previously generated sensor sweeps. The autonomous vehicle can predict based, at least in part, on the final fused representation of the plurality of sensors sweeps from the plurality of sensor sweeps, movement associated with the feature data one or more time steps in the future.

Another example aspect of the present disclosure is directed to a computer-implemented method. The method can include obtaining, by a computing system with one or more processors, a plurality of sensor sweeps from a sensor associated with an autonomous vehicle, each sensor sweep representing a particular time step between a current point in time and a past point in time. The method can include determining, by the computing system, movement data associated with movement of the autonomous vehicle from the past time to the current time. The method can include concurrently, for each respective sensor sweep in the plurality of sensor sweeps, generating, by the computing system, a respective image, the respective image comprising sensor data associated with the respective sensor sweep arranged in a two-dimensional representation. The method can include extracting, by the computing system using one or more first machine-learned models, feature data from the respective image. The method can include transforming, by the computing system using one or more second machine learned models with the feature data and the movement data of the autonomous vehicle as input, the feature data into a current coordinate frame associated with the current point in time. The method can include mapping, by the computing system, each point from the respective image to the image associated with the most recent sensor sweep. The method can include generating, by the computing system, a fused image by combining the images for each of the sensor sweeps. The method can include predicting, by the computing system based, at least in part, on the fused image from the plurality of sensor sweeps, movement associated with the feature data at one or more time steps in the future.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which:

FIG. 2B depicts a diagram of an example functional graph according to example implementations of the present disclosure.

DETAILED DESCRIPTION

Figure 1:
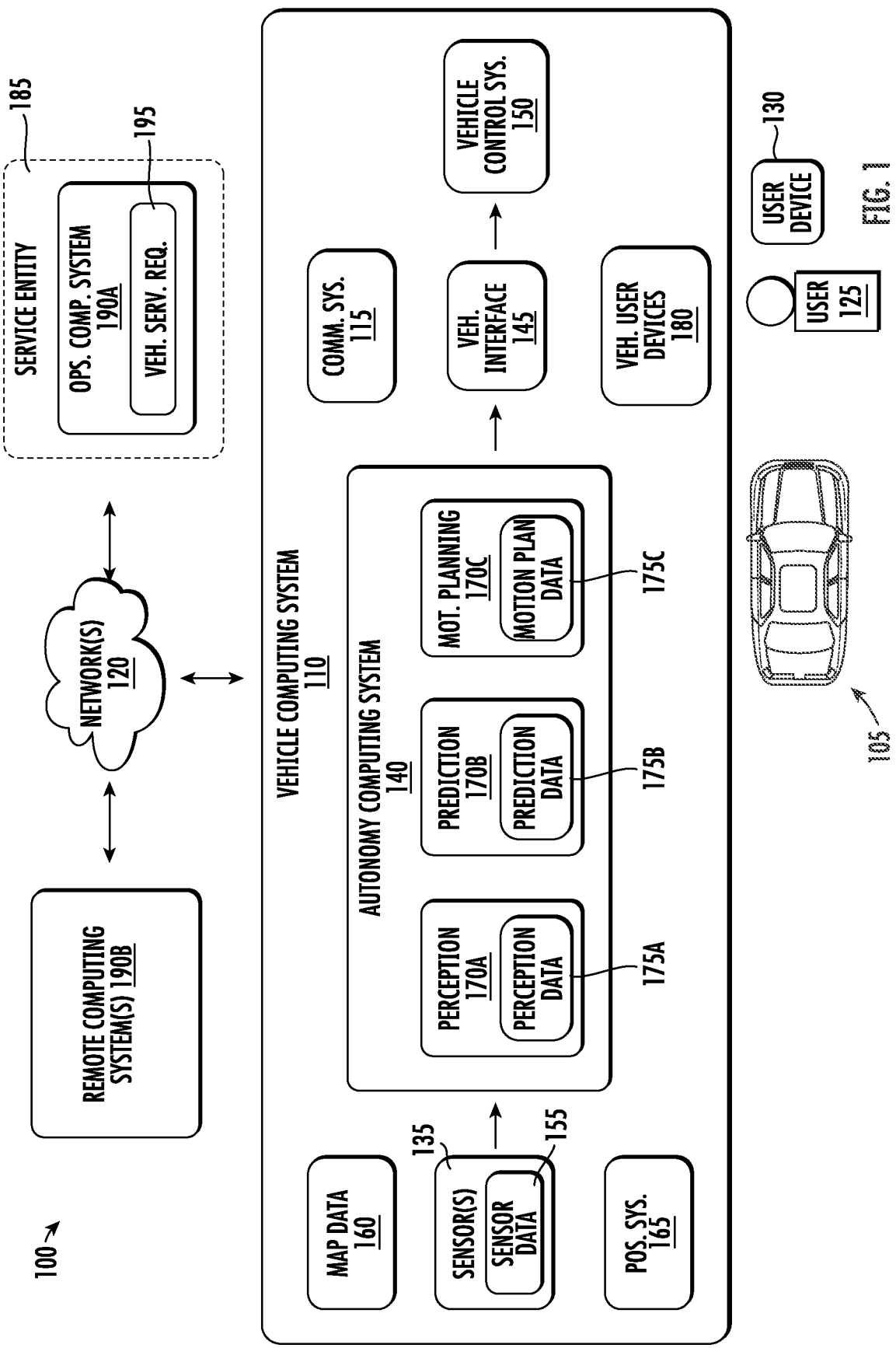
FIG. 1 depicts a block diagram of an example autonomous vehicle according to example embodiments of the present disclosure.

Generally, the present disclosure is directed towards a system for object detection and prediction by fusing together data from multiple sensor sweeps. Traditionally autonomous vehicle systems perform detection and prediction with separate systems. In contrast, the present disclosure is directed towards a system that performs detection and prediction using a joint model. To do so, the autonomous vehicle can generate sensor data from multiple sensor sweeps. Each sensor sweep represents a full revolution of the sensor (e.g., a LIDAR sensor) as the autonomous vehicle moves along a path. Thus, each sweep represents a different time step between a point in the past and the most recent sweep (effectively the current time). In addition, because the sensor sweeps are captured by a LIDAR sensor attached to the autonomous vehicle, as the autonomous vehicle moves, the coordinate frame of the sensor data included in each sensor sweep changes. For example, a stationary mailbox may appear in front of the autonomous vehicle in a sensor sweep associated with the current time but beside or behind the autonomous vehicle in a future sensor sweep as the autonomous vehicle moves past the mailbox.

The sensor data can be a point cloud representing an area around the autonomous vehicle (e.g., where the LIDAR sensor is located). Instead of converting the sensor data into a bird's eye view frame, a vehicle computing system associated with the autonomous vehicle can let the data remain in a range view. To be able to use the sensor data for detection and prediction, the vehicle computing system can convert each sensor sweep (e.g., the data gathered in a full revolution of the LIDAR sensor) into a two-dimensional image in range view. A range view image can present the captured sensor sweep data as seen from the perspective of the autonomous vehicle, with each point in the point cloud data projected to its corresponding position in the two-dimensional image.

In addition, the vehicle computing system can determine the motion of the autonomous vehicle during a particular period. For example, the vehicle computing system can access a location determination system (e.g., a GPS system) and determine the current position of the autonomous vehicle for each sensor sweep. The vehicle computing system can, for each sweep in the plurality of sweeps using a machine-learned model such as a convolutional neural network, extract feature data representing one or more features in the image. For example, features can include low-level components of an image including shapes, edges, lines, blobs, points, and so on.

Using the motion of the autonomous vehicle and the feature data for a first sensor sweep as input to a machine-learned model, the vehicle computing system can transform the feature data for the first sensor sweep into a coordinate frame associated with another time step. For example, if the vehicle computing system is transforming a first sensor sweep for a first time step to the coordinate frame of a second time step, the machine-learned model can output transformed data that represents the features of the first sensor sweep as it would have appeared had the data been captured from the autonomous vehicle position associated with second time step. In some examples, the vehicle computing system can implement an incremental fusion system. While performing the incremental fusion process, each sensor sweep can be transformed into the coordinate system of the sensor sweep associated with the subsequent time step. Additionally, or alternatively, the vehicle computing system can implement a system in which all sensor sweeps are transformed into the coordinate frame of the most recent sensor sweep (e.g., the current sensor sweep).

Once the features have been transformed into another coordinate frame, the vehicle computing system can determine the position of each point in the current image once it has been placed in an image associated with the new coordinate frame. Each feature in the feature data can then be mapped to a feature in the current time frame or the next time frame, depending on whether the vehicle computing system is fusing all the sweeps simultaneously or is fusing the image into the next time step in an incremental fusion system.

The fused data can represent the movement of each object in the feature data over a particular time frame from the perspective of the current position of the autonomous vehicle. This data can then be used to predict the future motion of the objects. The autonomous vehicle can use the prediction data in order to accurately plan safe motion paths.

An autonomous vehicle can include a vehicle computing system that performs the detection and prediction functions using the joint model. The vehicle computing system can also be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, and generate trajectories for the vehicle to follow based on the route/perceived objects/predicted object motion. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

The computing system of an autonomous vehicle can include a plurality of devices (e.g., physically-connected devices, wirelessly-connected devices, virtual devices running on a physical machine, etc.) that implement a software graph architecture of the autonomous vehicle. For instance, the computing devices can implement the vehicle's autonomy software that helps allow the vehicle to autonomously operate within its environment.

To accomplish these operations, the autonomy computing system can include, for example, a perception system, a prediction system, and a motion planning system. Many of the functions performed by the perception system, prediction system, and motion planning system can be performed, in whole or in part, by one or more machine-learning models. Moreover, one or more of the perception system, prediction system, and/or motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to a machine-learned model(s). In addition or alternatively, the autonomous vehicle can access map data (e.g., high definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system can utilize the sensor data to identify one or more objects in the local environment of the autonomous vehicle. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system can use the perception data to generate predictions for the movement of one or more objects as an object trajectory including one or more future coordinates/points. In some implementations, the perception and prediction functions of the vehicle computing system can be included within the same system. The vehicle computing system can use the perception data, prediction data, map data, and/or other data to generate a motion plan for the vehicle.

More specifically, the vehicle computing system can use a joint perception and prediction system that fuses multiple sensor sweeps to improve object detection and prediction. To so, the vehicle computing system includes a fusion system, that takes sensor data as input and produces a representation of multiple different sensor sweeps that are fused together to have a common coordinate system and have the features (or points) in each of the sensor sweeps mapped to the features of the other sensor sweeps. This allows the vehicle computing system to more accurately predict the movement of objects without having to convert the sensor data into a bird's eye view.

To do so, the fusion system can include an image generation system, a feature extraction system, a transformation system, and a correlation system. The fusion system can receive sensor data from a sensor. In some examples, the sensor can be a LIDAR sensor that generates a point cloud representing the three-dimensional space around the autonomous vehicle. Each point in the point cloud can represent an instance of a laser being projected from the LIDAR system and being reflected back to be sensed. Each point can be associated with a particular distance and a luminance. The distance associated with a point in a point cloud can represent the distance from the sensor to an object that reflects the laser and can be determined based on the time needed to detect the reflected laser. In some examples, the luminance can be associated with the reflectivity of the object. In some examples, each point can be associated with a particular laser of a plurality of lasers in the LIDAR. In other examples, the point can have an associated azimuth angle, which represents the direction of the sensor at the time the measurement was taken, and an elevation angle, which represents the height of the point relative to the sensor.

A LIDAR sensor can continuously generate sensor data from the area/environment around the autonomous vehicle. The sensor data can be divided into a time-series of K sensor sweeps, each sweep representing a full rotation of the sensor system (e.g., a 360-degree rotation of the LIDAR sensor). The time-series of sensor sweeps can be denoted $\{S_k\}_{k=0}^{1-K}$ wherein k=0 is the most recent sensor sweep (e.g., the current sweep) and $-K<k<0$ are the past sensor sweeps. Each sensor sweep includes a plurality of points $$S_k = \{p_k^i\}_{i=0}^{N_k-1}.$$

A point in the n-th sweep can be represented by its three-dimensional coordinates $[x_n^i, y_n^i, z_n^i]$ in the coordinate frame associated with the n-th sensor sweep. The coordinate frame for a given sensor sweep can be defined based on the position of the LIDAR sensor at the time the sensor sweep was conducted. Thus, two points can have the same coordinate relative to the sensor itself but be at different actual locations if the sensor or its associated autonomous vehicle has moved between the time that the two points were measured.

Thus, each sensor sweep can record objects around the autonomous vehicle at a particular point in time. The fusion system can select a plurality of sensor sweeps to use for perception and prediction at a particular moment in time. The plurality of sensor sweeps can include a most recent sensor sweep (e.g., a current sensor sweep) and a predetermined number of passed sensor sweeps that represent all sensor sweeps from the current point in time to a past point in time. In some examples, the sensor sweeps may include all sensor sweeps for the last 5 seconds. Thus each sensor sweep can have associated sensor data and can be associated with a particular point in time.

In addition, the fusion system can receive information about the position of the autonomous vehicle at the time a particular sensor sweep was obtained. Such positional information can be generated by any appropriate positioning system (e.g., GPS, dead reckoning, and so on).

The image generation system can receive data representing one or more sensor sweeps. For each sensor sweep, the image generation system can generate a two-dimensional image. The image generation system can generate the two-dimensional image by projecting each point in the point cloud onto a corresponding location on the two-dimensional surface such that the data is presented in a range view. In this context, a range view means that the sensor data is represented from the perspective of the sensor itself rather than from a top-down view or bird's eye view.

To project a particular point on the two-dimensional surface, the image generation system can access data associated with the point including the identification of the laser associated with the point (e.g., which laser from a plurality of lasers measured the particular point) and the azimuth angle of the sensor at the time the point was measured. Thus, each point $p_n^i$ can be projected such that $P(p_n^i) = (l_n^i, \lfloor \theta_n^i / \Delta\theta \rfloor)$ where the row is specified by the point's associated laser or elevation angle and the column is determined by its azimuth angle. The value of $\Delta\theta$ is approximately the angular resolution of the LiDAR. The resulting image can be a range view image, which is the native representation of LiDAR data.

Once images have been generated for each sensor sweep, the feature extraction system can pass them as input passed to a convolution network to extract feature data. Feature data, in this context, can represent any discernible visual information included in the image including but not limited to points, lines, edges, objects, and so on. The feature data, when extracted initially, can be represented in the coordinate frame of the image from which the data was extracted. Each image may have an associated machine-learned model as long as the weights associated with the model are the same for all machine-learned models that are used for feature extraction.

The transformation system can use the feature data and movement data associated with the autonomous vehicle as input to another convolution neural network. The network can transform the feature data from its original coordinate frame to another coordinate frame. In some examples, the fusion system can perform a late fusion process. In a late fusion process, the feature data associated with all sensor sweeps can be transformed into the coordinate frame of the most recent sensor sweep (e.g., the current sensor sweep).

In another example, the fusion system can perform an incremental fusion process. When performing an incremental fusion process, the transformation system can transform the feature data from its original coordinate frame into the coordinate frame of the next sensor sweep (chronologically). Thus, when performing incremental fusion, each sweep can be combined with the next sweep and used as input in the next step whether the combined sweeps are transformed into the coordinate frame of the next sensor sweep. This process repeats, such that each sensor sweep is transformed and concatenated with the previous sensor sweeps until the most recent sensor sweep is reached and the iterative process ends. The coordinate frame, in this case, changes relatively slowly and as a result, incremental fusion can result in less distortion.

Once the images have been put in a common coordinate frame (either all into the coordinate frame from the most recent sensor sweep or into the coordinate frame of the next sensor sweep), the correlation system can generate a mapping between the points in a first image and one or more locations in a second image based on the new coordinate frame. In some examples, the process can be referred to as feature warping. By repeating this process for each LiDAR point in the previous sweeps, the correlation system can obtain a mapping between all points in the previous images and a target image (e.g., either the next image or the image associated with the most recently captured sensor sweep).

The images in the individual sweeps can be passed into one or more machine-learned models. In some examples, if more than one machine-learned model is used, the parameters associated with the machine-learned models (e.g., weights and so on) are shared across all sweeps. The individual sweep images can then be considered a fused image. Because the fused image can include data from a plurality of sequential sensor sweeps and has been corrected to put the data into the coordinate frame associated with the most recent sensor sweep such that it is not affected by the movement of the autonomous vehicle, the fused images can represent the movement of objects as though the autonomous vehicle had been stationary at the position of associated with the most recent sensor sweep.

The data included in the fused image can be used as input into a machine-learned model. The machine-learned model can use feature data to identify one or more objects within the fused image and the past movement of those objects between the earliest sensor sweep and the most recent sensor sweep. A prediction system can use this data to predict the future movement and trajectories of each of the one or more identified objects.

The following provides an end-to-end example of the technology described herein. An autonomous vehicle can include a vehicle computing system. The vehicle computing system can obtain a plurality of sensor sweeps from a sensor associated with an autonomous vehicle, each sensor sweep being with a time step between a current point in time and a past point in time. In some examples, the sensor sweep can include sensor data. The sensor data can be point cloud data collected by a LIDAR sensor.

In some examples, each sweep in the plurality of sweeps represents a complete revolution of the LIDAR sensor. For example, a LIDAR sensor can continuously take measurements of the area around the autonomous vehicle by projecting lasers and detecting when they reflect back. The vehicle computing system can slice that continuous data up into discrete revolutions, each revolution having an associated position and time. The sliced-up sensor data associated with a particular revolution can be referred to as a sensor sweep. In some examples, each point in the point cloud data has an associated luminance value.

In some examples, each sensor sweep can have an associated coordinate frame, the coordinate frame being based on the position of the autonomous vehicle. For example, if the coordinate frame is a Cartesian plane, the dimensions can be determined based on the position and pose of the autonomous vehicle. Thus, the autonomous vehicle can represent {0, 0} with the positive values on the y-axis representing the space in front of the autonomous vehicle and the negative values representing the space behind the autonomous vehicle. Similarly, the x-axis can represent left and right of the autonomous vehicle. Thus, the coordinate frame associated with each sensor sweep is based on a location of the autonomous vehicle when the sensor data associated with the sweep was captured.

The vehicle computing system can determine movement data associated with movement of the autonomous vehicle from the past point in time to the current point in time. For example, the vehicle computing system can determine the position of the autonomous vehicle at each step based on a set of coordinates independent of the autonomous vehicle (e.g., latitude/longitude). In other examples, the movement of the autonomous vehicle can be represented as a change from the previous time step. Thus, the movement can be represented by a direction and a distance.

For each respective sensor sweep in the plurality of sensor sweeps and beginning with the least recent sensor sweep in the plurality of sensor sweeps and repeating with each subsequent sensor sweep until the most recent sensor sweep, the vehicle computing system can generate, based on the respective sensor sweep, a respective image associated with the respective sensor sweep, the image comprising sensor data included in the respective sensor sweep arranged in a two-dimensional representation of the three-dimensional sensor data.

For example, the vehicle computing system can project each point in the point cloud data onto a two-dimensional image. The row of the image can be determined based on the elevation angle associated with the point or a specific laser identification associated with the point (e.g., for LIDAR systems with multiple lasers that measure objects at different heights). The column positioning of the point can be based on the azimuth angle of the LIDAR sensor at the time the point was measured. In some examples, the respective image is generated based, at least in part, on the luminance values associated with the points in the point cloud data.

In some examples, while performing an incremental fusion process, the vehicle computing system can combine the respective image with mapped feature data associated with the previous sensor sweep. In this way, the extracted features of each sensor sweep can be transformed into the coordinate frame of the next sensor sweep and fused into the next frame image at each step. This can result in less overall distortion than would be introduced by shifting sensor sweeps into the current coordinate frame directly.

The vehicle computing system can extract feature data from the respective image. Feature data can include low level image components such as lines, edges, shapes, and so on. In some examples, the feature data is extracted using one or more machine-learned models with the respective images as input. In some examples, the one or more machine-learned models can be convolutional neural networks. The weights associated with the machine-learned models can be shared for all the machine-learned models used to extract feature data from the plurality of images. In this way, the vehicle computing system can improve the likelihood of extracting similar features from each image, which makes it easier to fuse them later in the process.

The vehicle computing system can transform the feature data into a coordinate frame associated with a next time step using the feature data and the movement data associated with the autonomous vehicle. In some examples, the trans-formation can be performed, at least in part, using one or more machine-learned models. In this way, the current image and its associated feature data can be put in the same coordinate frame of reference as the image associated with either the next sensor sweep (for incremental fusion) or the most recent sensor sweep (for late fusion). Doing so removes the motion of the autonomous vehicle and allows the vehicle computing system to identify the motion of each object.

The vehicle computing system can map each point from the respective image to feature data in an image associated with the next time step to generate a fused image. In some examples, the vehicle computing system can perform a late fusion process and map the points from the respective image to the image associated with the most recent time step. Once each image associated with the plurality of times steps has been mapped to the image of the most recent time step, the vehicle computing system can generate a fused image.

While performing an incremental fusion process, the vehicle computing system each sensor sweep can be processes sequentially with the order of processing strictly controlled based on the order in which they were obtained, with each sensor sweep being processed and combined with the next sensor sweep before the next sensor sweep is fully processed. In contrast, while performing a late fusion process, the vehicle computing system can process the sensor sweeps concurrently. In this case, concurrently processing the sensor sweeps can involve processing the sensor sweeps simultaneously or alternatively, concurrently processing can involve processing them in an overlapping fashion in which the order in which the processing occurs is not necessarily strictly enforced.

The vehicle computing system can generate a final fused representation of the plurality of sensors sweeps once a sensor sweep associated with the current time step has been combined with all previously generated sensor sweeps. The final fused representation of the plurality of sensors sweeps can use the coordinate frame of the current sensor sweep. The final fused representation can include one or more spatial-temporal features. The vehicle computing system can identify one or more objects in the feature data. The vehicle computing system can determine past movement for the one or more objects based on the mapped feature data.

The vehicle computing system can predict based, at least in part, on the final fused representation of the plurality of sensors sweeps from the plurality of sensor sweeps, movement associated with the feature data at a future point in time. In some examples, this prediction can be the output of one or more machine-learned models. For example, the vehicle computing system can determine a predicted position for the one or more objects at one or more time steps in the future. One example process for making these predictions can include determining a probability (p) for future trajectories objects as follows:

$$p(\mathcal{T}) = \prod_{t=0}^{T} \prod_{i=1}^{N} p(\tau_t^i)$$

In this example, N is the number of detected objects, T is the number of time steps for which motion is predicted, and $\tau_t^i$ is the position of the i-th object at the t-th time step represented by the corners of its bounding box. Additionally, if the spatial dimensions of the bounding box are independent and drawn from Laplace distributions; therefore, the probability of the trajectories can become, $$p(\mathcal{T}) = \prod_{t=0}^{T}\prod_{i=1}^{N}\prod_{j=1}^{D} p(\tau_t^{ij}; v_t^{ij}, b_t^{ij}) \propto \prod_{t=0}^{T}\prod_{i=1}^{N}\prod_{j=1}^{D} \frac{1}{2b_t^{ij}} \exp\left(-\frac{|\tau_t^{ij} - v_t^{ij}|}{b_t^{ij}}\right)$$

where D is the dimensionality of the bounding box, and $v_t^{ij} \in \mathbb{R}$ and $b_t^{ij} \in \mathbb{R}_+$ are the mean and scale of the Laplace distribution corresponding to the j-th dimension of the i-th object's bounding box at time t. In some examples, the Laplace distribution can closely match the empirical distribution of the bounding box corners for a detection task. To estimate the probability p(T) of a particular trajectory given a sequence of LiDAR sweeps, the computing system can predict a set of means as follows:

$v = \{v_0^0, v_1^0, \ldots, v_T^N\}$ and scales $\mathcal{B} = \{b_0^0, b_1^0, \ldots, b_T^N\}$ where $v_t^i = [v_t^{i0}, v_t^{i1}, \ldots, v_t^{iD}] \in \mathbb{R}^D$ and $b_t^i = [b_t^{i0}, b_t^{i1}, \ldots, b_t^{iD}] \in \mathbb{R}_+^D$.

In order to predict the trajectories of all the objects, the vehicle computing system can identify the LiDAR points that lie on objects. Thus, the vehicle computing system can predict a set of class probabilities for each point in the range image at t=0. Assuming a LiDAR point is on an object, the vehicle computing system can predict a probability distribution over one or more bounding box trajectories. The vehicle computing system can output, for each point, a set of displacement vectors, a set of rotation angles, and a set of uncertainties for each timestep in the future. The predicted uncertainty can be a represented by multimodal probability distribution or a unimodal probability To cluster predictions from individual LiDAR points, the vehicle computing system can us an approximate mean shift algorithm. The vehicle computing system can employ a simple average over the individual bounding box parameters at each time-step, i.e. the mean of each time-step's center, dimensions, and orientation. This information can be used by a path planning system to generate a path for an autonomous vehicle. Various means can be configured to perform the methods and processes described herein. For example, a computing system can include data obtaining units(s), movement determination units(s), image generation units(s), feature extraction unit(s), transformation unit(s), mapping unit(s), fusion unit(s), prediction unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit (s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain a plurality of sensor sweeps from a sensor associated with an autonomous vehicle, each sensor sweep being with a time step between a current point in time and a past point in time. For example, a vehicle computing system can receive sensor data from a LIDAR sensor in the form of a point cloud. A data obtaining unit is one example of a means for obtaining a plurality of sensor sweeps from a sensor associated with an autonomous vehicle, each sensor sweep being with a time step between a current point in time and a past point in time.

The means can be configured to determine movement data associated with movement of the autonomous vehicle from the past point in time to the current point in time. For example, a location determining system (e.g., a GPS) can track the position of the autonomous vehicle and periodically store the location of the autonomous vehicle. A movement detection unit is one example of a means for determining movement data associated with movement of the autonomous vehicle from the past point in time to the current point in time.

The means can be configured to generate, based on the respective sensor sweep, a respective image associated with the respective sensor sweep, the image comprising sensor data included in the respective sensor sweep arranged in a two-dimensional representation of the three-dimensional sensor data. For example, the vehicle computing system can project each point in the point cloud data onto a two-dimensional image based on the elevation angle and azimuth angle associated with the point. An image generation unit is one example of a means for generating, based on the respective sensor sweep, a respective image associated with the respective sensor sweep, the image comprising sensor data included in the respective sensor sweep arranged in a two-dimensional representation of the three-dimensional sensor data.

The means can be configured to transform, using a machine learned model with the feature data and the movement data of the autonomous vehicle as input, the feature data into a coordinate frame associated with a next time step. For example, the vehicle computing system can determine where the features of the respective image would have appeared had the LIDAR system been positioned at the same place as the next time step when the measurement was taken. A transformation unit is one example of a means for transforming, using a machine learned model with the feature data and the movement data of the autonomous vehicle as input, the feature data into a coordinate frame associated with a next time step.

The means can be configured to map each point from the respective image to the image associated with the next time step to generate a fused image. For example, the vehicle computing system can determine the location for each point in the current image in an image associated with the new coordinate frame. A mapping unit is one example of a means for mapping each point from the respective image to the image associated with the next time step to generate a fused image.

The means can be configured to generate a final fused representation of the plurality of sensors sweeps once a sensor sweep associated with the current time step has been combined with all previously generated sensor sweeps. For example, the vehicle computing system can generate a plurality of mappings of each sensor sweep into the coordinate frame of the most recent sensor sweep by fusing each image into the image associated with the subsequent time step. Once all sensor sweeps have been fused, the product can be a final fused representation of the plurality of sensors sweeps that has all sensor sweep data in the coordinate frame of the most recent sensor sweep. A fusion unit is one example of a means for generating a final fused representation of the plurality of sensors sweeps once a sensor sweep associated with the current time step has been combined with all previously generated sensor sweeps.

The means can be configured to predict, using the final fused representation of the plurality of sensors sweeps from the plurality of sensor sweeps as input to a machine-learned model, movement associated with the feature data at a future point in time. For example, the vehicle computing system can, for each feature or detected object, generate a predicted trajectory or a statistical distribution of possible trajectories based on the final fused image, which can be used to determine the past movement of the object, among other data. A prediction unit is one example of a means for predicting, using the final fused representation of the plurality of sensors sweeps from the plurality of sensor sweeps as input to a machine-learned model, movement associated with the feature data at a future point in time.

The systems and methods described herein provide a number of technical effects and benefits. More particularly, the systems and methods of the present disclosure provide improved techniques for detecting objects and predicting their movement. Specifically, the fusion system can enable the autonomous vehicle to use multiple sensor sweeps to detect objects and predict their path more efficiently without the drawbacks of other systems. Specifically, by using a range view rather than a bird's eye view, the fusion system can avoid time consuming and costly calculations converting data between the two views and avoid losing low level detection data that can allow the system to perform detection tasks more accurately. As a result, the vehicle computing system can more efficiently detect objects and predict their trajectories. This results in a reduction in the number of processing cycles necessary, reducing the amount of data storage needed, and reducing the amount of energy used by the system. Reducing energy consumption also increases the useful battery life of any battery systems included in the autonomous vehicle. Furthermore, improving the capabilities of the detection and prediction systems allows the autonomous vehicle to travel more safely.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WIFI access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more subsystems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different subsystems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects within the surrounding environment of the vehicle 105 based at least in part on the sensor data from the sensors 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more fusion systems that use neural networks to extract feature data from a plurality of sensor sweeps (or images generated based on the sensor sweeps) and transform the feature data into a common coordinate frame. The transformed data can be used to identify object(s) within the surrounding environment of the vehicle 105 and the state data associated therewith. The perception data 175A can be utilized for the prediction function 170B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 170B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can consider a route/route data when performing the motion planning function 170C.

The motion planning function 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning function 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectory. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back-passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of vehicle 105 can provide user input to adjust a destination location of vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., it's one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2A:
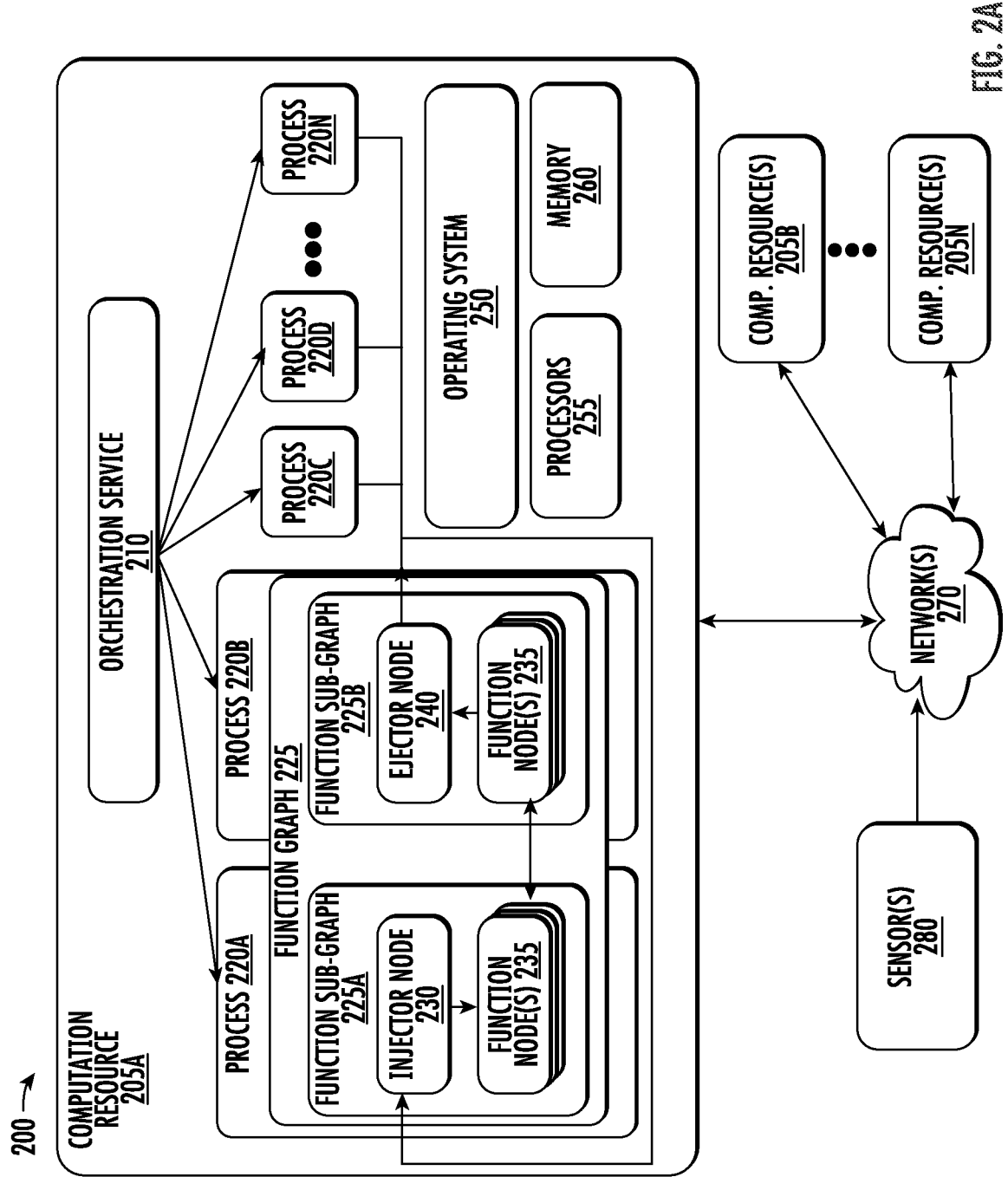
FIG. 2A depicts a diagram of an example system including a plurality of devices configured to execute one or more processes according to example implementations of the present disclosure.

FIG. 2A depicts a diagram of an example computing system 200 including one or more of the plurality of devices (e.g., plurality of devices 205A-N) of the computing system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a plurality of (e.g., series of) function nodes 235 arranged (e.g., by one or more directed edges) in a pipeline, graph architecture, etc.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235 can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

Each function node of the plurality of function nodes 235A-F can be arranged in a directed graph architecture (e.g., including a plurality of function graphs) and can be configured to obtain function input data associated with an autonomous vehicle based on the one or more directed edges 245 (e.g., of the directed graph 225). For instance, the function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. The function nodes 235A-F can generate function output data based on the function input data. For instance, the function nodes 235A-F can perform one or more functions of the autonomous vehicle on the function input data to obtain the function output data. The function nodes 235A-F can communicate the function output data to one or more other function nodes of the plurality of function nodes 235A-F based on the one or more directed edges 245 of the directed graph 225.

In addition, or alternatively, each function graph 225 can include one or more injector nodes 230A-B and one or more ejector nodes 220A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example, each of the one or more injector nodes 230A-B can include a function configured to obtain and/or process sensor data from a respective sensor 280 shown in FIG. 2A (e.g., sensor(s) 135 of FIG. 1). The ejector nodes 240A-B can be configured to communicate with one or more devices 205B-N and/or processes 220C-220N outside the function graph 225 to provide function output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes. For instance, the messages communicated between nodes of a sub-graph dedicated to motion planning for an autonomous vehicle can help identify a basis path for the vehicle given the area/environment in which the vehicle is operating, motion constraints, costs, vehicle trajectories, etc.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N, etc. of the computing system 200 (e.g., the plurality of processes of the vehicle computing system 110, a plurality of processes of the one or more remote devices, etc.) can be communicatively connected over one or more wireless and/or wired networks 120. For instance, the plurality of devices 205A-N (and/or processes 220A-N of device 205A) can communicate over one or more communication channels. Each device and/or process can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. The messages, for example, can include function output data associated with a respective function node (e.g., 235).

Figure 3:
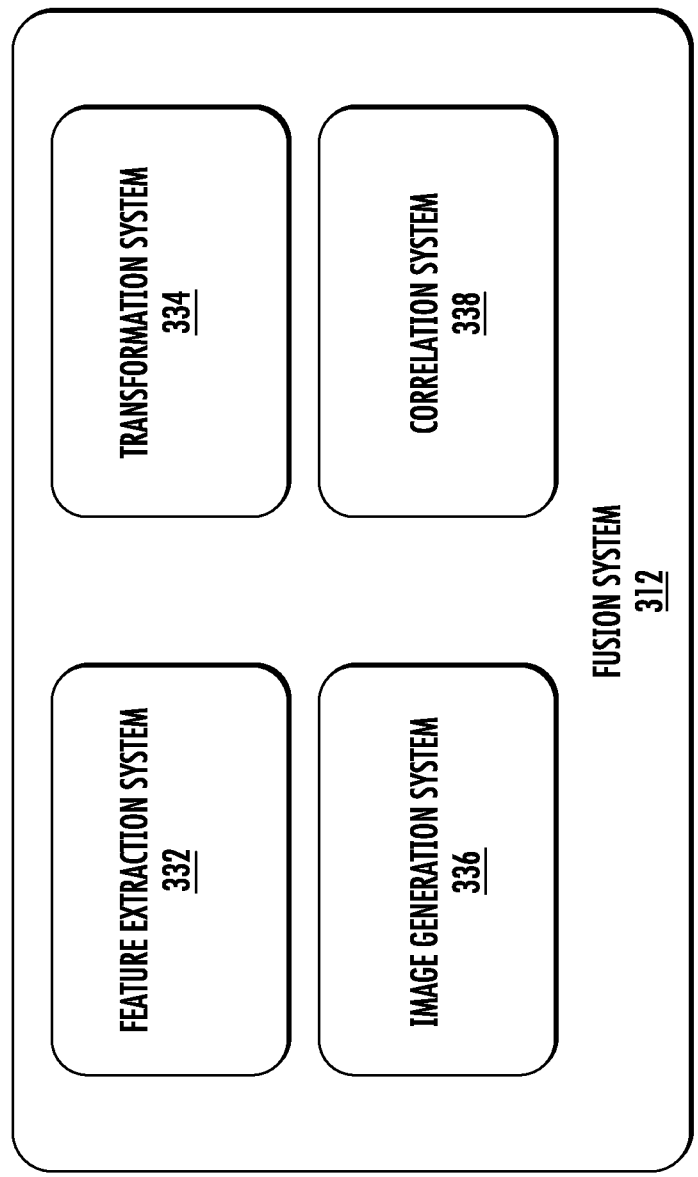
FIG. 3 depicts a block diagram of an example fusion system according to example embodiments of the present disclosure.

FIG. 3 depicts a block diagram of an example fusion system 312 according to example embodiments of the present disclosure. The fusion system 312 can take sensor data as input and produce a representation of multiple different sensor sweeps that are fused together to have a common coordinate system and have the features (or points) in each of the sensor sweeps mapped to the features of the other sensor sweeps. This can allow the vehicle computing system (e.g., vehicle computing system 110 in FIG. 1) to more accurately predict the movement of objects without having to convert the sensor data into a bird's eye view.

To do so, the fusion system 312 can include an image generation system 336, a feature extraction system 332, a transformation system 334, and a correlation system 338. The fusion system 312 can receive sensor data (e.g., sensor data 155 in FIG. 1) from a sensor (e.g., sensor 135 in FIG. 1). In some examples, the sensor (e.g., sensor 135 in FIG. 1) can be a LIDAR sensor that generates a point cloud representing the three-dimensional space around the autonomous vehicle. Each point in the point cloud can represent an instance of a laser being projected from the LIDAR system and reflected back to be sensed. Each point can be associated with a particular distance and a luminance. The distance associated with a point in a point cloud can represent the distance from the sensor to an object that reflects the laser and can be determined based on the time needed to detect the reflected laser. In some examples, the luminance can be associated with the reflectivity of the object. In some examples, each point can be associated with a particular laser of a plurality of lasers in the LIDAR. In other examples, the point can have an associated azimuth angle, which represents the direction of the sensor at the time the measurement was taken, and an elevation angle, which represents the height of the point relative to the sensor.

A LIDAR sensor can continuously generate sensor data from the area/environment around the autonomous vehicle (e.g., autonomous vehicle 105 in FIG. 1). The sensor data can be divided into a time-series of K sensor sweeps, each sweep representing a full rotation of the sensor system (e.g., a 360-degree rotation of the LIDAR sensor). The time-series of sensor sweeps can be denoted $\{S_k\}_{k=0}^{1-K}$ wherein k=0 is the most recent sensor sweep (e.g., the current sweep) and −K<k<0 are the past sensor sweeps. Each sensor sweep includes a plurality of points $$S_k = \{p_k^i\}_{i=0}^{N_k-1}.$$

A point in the n-th sweep can be represented by its three-dimensional coordinates $[x_n^i, y_n^i, z_n^i]$ in the coordinate frame associated with the n-th sensor sweep. The coordinate frame for a given sensor sweep can be defined based on the position of the LIDAR sensor at the time the sensor sweep was conducted. Thus, two points can have the same coordinate relative to the sensor itself but be at different actual locations if the sensor or its associated autonomous vehicle has moved between the time that the two points were measured.

Thus, each sensor sweep can record objects around the autonomous vehicle (e.g., autonomous vehicle 105 in FIG. 1) at a particular point in time. The fusion system 312 can select a plurality of sensor sweeps to use for perception and prediction at a particular moment in time. The plurality of sensor sweeps can include a most recent sensor sweep (e.g., a current sensor sweep) and a predetermined number of passed sensor sweeps that represent all sensor sweeps from the current point in time to a past point in time. In some examples, the sensor sweeps may include all sensor sweeps for the last 5 seconds. Thus each sensor sweep can have associated sensor data and can be associated with a particular point in time.

In addition, the fusion system 312 can receive information about the position of the autonomous vehicle (e.g., autonomous vehicle 105 in FIG. 1) at the time a particular sensor sweep was obtained. Such positional information can be generated by any appropriate positioning system (e.g., GPS, dead reckoning, and so on).

The image generation system 336 can receive data representing one or more sensor sweeps. For each sensor sweep, the image generation system can generate a two-dimensional image. The image generation system 336 can generate the two-dimensional image by projecting each point in the point cloud onto a corresponding location on the two-dimensional surface such that the data is presented in a range view. In this context, a range view means that the sensor data is represented from the perspective of the sensor itself rather than from a top-down view or bird's eye view.

To project a particular point on the two-dimensional surface, the image generation system 336 can access data associated with the point including the identification of the laser associated with the point (e.g., which laser from a plurality of lasers measured the particular point) and the azimuth angle of the sensor at the time the point was measured. Thus, each point $p_n^i$ can be projected such that $P(p_n^i)=(l_n^i, \lfloor \theta_n^i/\Delta\theta \rfloor)$ where the row is specified by the point's associated laser or elevation angle and the column is determined by its azimuth angle. The value of $\Delta\theta$ is approximately the angular resolution of the LiDAR. The resulting image can be a range view image, which is the native representation of LiDAR data.

Once images have been generated for each sensor sweep, the feature extraction system 332 can pass them as input passed to a convolution network to extract feature data. Feature data, in this context, can represent any discernible visual information included in the image including but not limited to points, lines, edges, objects, and so on. Identifying features can be accomplished by analyzing each pixel in the image or groups of pixels in the image and determining, for each pixel or each group of pixels, whether it includes a feature. In some examples, each feature type (edges, corners, blobs, ridges) can be identified using a different method.

The feature data, when extracted initially, can be represented in the coordinate frame of the image from which the data was extracted. Each image may use a distinct instantiation of a machine-learned model as long as the weights and biases associated with the model are the same for all machine-learned models that are used for feature extraction. Thus, if the machine-learned models are neural networks, the weights of the connections between one or more neurons in the network and the bias (or offset) values must be the same.

The transformation system 334 can use the feature data and movement data associated with the autonomous vehicle as input to another convolution neural network. The convolution neural network can transform the feature data from its original coordinate frame to another coordinate frame. In some examples, the fusion system 312 can perform a late fusion process. In a late fusion process, the feature data associated with all sensor sweeps can be transformed into the coordinate frame of the most recent sensor sweep (e.g., the current sensor sweep) before it is fused.

In another example, the fusion system 312 can perform an incremental fusion process. When performing an incremental fusion process, the transformation system 334 can transform the feature data from its original coordinate frame into the coordinate frame of the next sensor sweep (chronologically). Thus, when performing incremental fusion, each sweep can be combined with the next sweep and used as input in the next step whether the combined sweeps are transformed into the coordinate frame of the next sensor sweep. This process repeats, such that each sensor sweep is transformed and concatenated with the previous sensor sweeps until the most recent sensor sweep is reached and the iterative process ends. The coordinate frame, in this case, changes relatively slowly and as a result, incremental fusion can result in less distortion. It should be noted that in some examples, when the sensor sweep is transformed into a new coordinate frame, one point in the point cloud data may occlude another point in the point cloud data such that when they are mapped onto a two-dimensional range view image, the two points are mapped to the same pixel. In this example, the transformation system can select the point that is closer to the LIDAR sensor in the new coordinate frame to be mapped onto that pixel.

Once the images have been put in a common coordinate frame (either all into the coordinate frame from the most recent sensor sweep or into the coordinate frame of the next sensor sweep), the correlation system 338 can generate a mapping between the points in a first image and one or more locations in a second image based on the new coordinate frame. In some examples, the process can be referred to as feature warping. By repeating this process for each LiDAR point in the previous sweeps, the correlation system 338 can obtain a mapping between all points in the previous images and a target image (e.g., either the next image or the image associated with the most recently captured sensor sweep).

The images in the individual sweeps can be passed into one or more machine-learned models. In some examples, if more than one machine-learned model is used, the parameters associated with the machine-learned models (e.g., weights and so on) are shared across all sweeps. The individual sweep images can then be considered a fused image. Because the fused image can include data from a plurality of sequential sensor sweeps and has been corrected to put the data into the coordinate frame associated with the most recent sensor sweep such that it is not affected by the movement of the autonomous vehicle, the fused images can represent the movement of objects as though the autonomous vehicle had been stationary at the position associated with the most recent sensor sweep.

The data included in the fused image can be used as input into a machine-learned model. The machine-learned model can use feature data to identify one or more objects within the fused image and the past movement of those objects between the earliest sensor sweep and the most recent sensor sweep. A prediction system can use this data to predict the future movement and trajectories of each of the one or more identified objects.

Figure 4A:
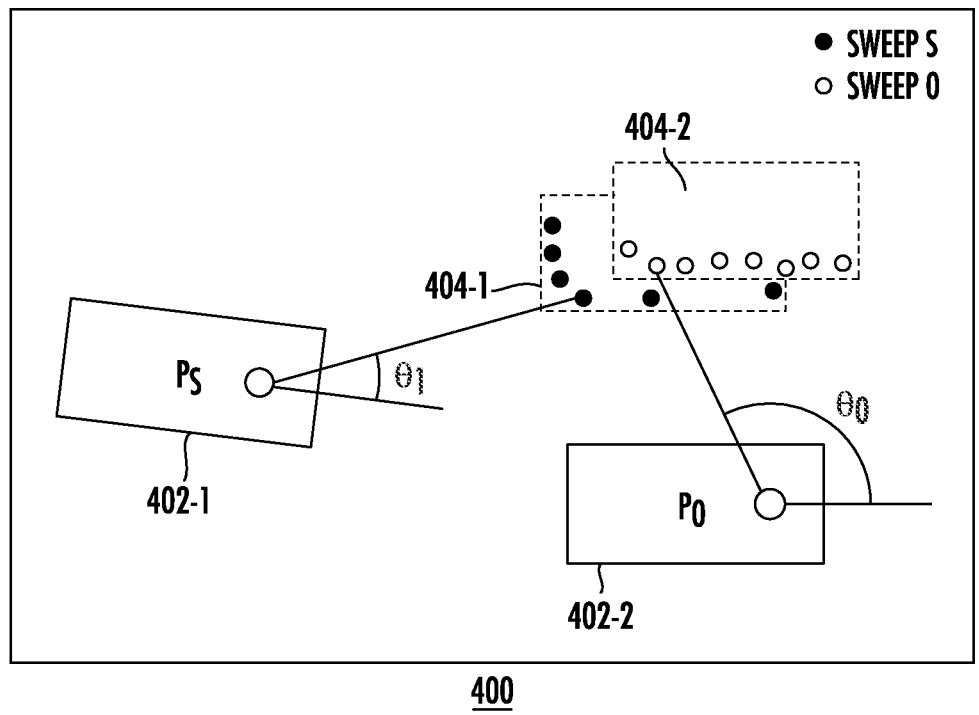
FIG. 4A depicts an example diagram illustrating sensor data presented in a bird's eye view presentation according to example embodiments of the present disclosure.

FIG. 4A depicts an example diagram illustrating sensor data presented in a bird's eye view presentation according to example embodiments of the present disclosure. In this example, an autonomous vehicle 402 moves through an environment 400. It should be noted that the autonomous vehicle is represented at multiple positions and as such can be referred to generally by the reference number 402, while specific positions of the autonomous vehicle can have an associated additional reference indicator. Thus, when referring to the autonomous vehicle at a specific point in time or location either 402-1 or 402-2 can be used depending on which position and/or point in time is being referenced. Similarly, the object can be referred to generally with 404 or a specific instance can be referred to as 404-1 or 404-2.

At a first point in time, the autonomous vehicle 402-1 can be at a first position. As time passes, the autonomous vehicle moves, such that at a second time the autonomous vehicle 402-2 can be at a second position. An object 404 in the area of the autonomous vehicle 402 can also move during the first time and the second time. In this example, at a first time the object 404-1 can be at a first position and the object 404-2 can be at a second position at a second time.

As can be seen, the angle and distance to the object 404 to the autonomous vehicle 402 can change as the positions of the autonomous vehicle 402 and the object 404 change, both in an external coordinate frame and relative to each other. In this example, the angle from the autonomous vehicle 402-1 to the object 404-1 at the first time is less than the angle from the autonomous vehicle 402-2 to the object 404-2 at the second time.

Figure 4B:
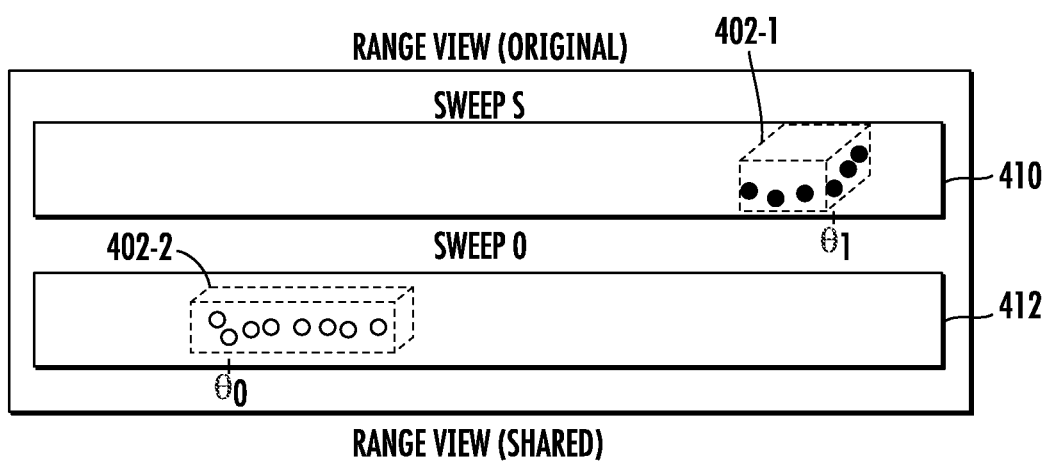
FIG. 4B depicts an example diagram illustrating sensor data presented in a range view presentation according to example embodiments of the present disclosure.
Figure 4B:
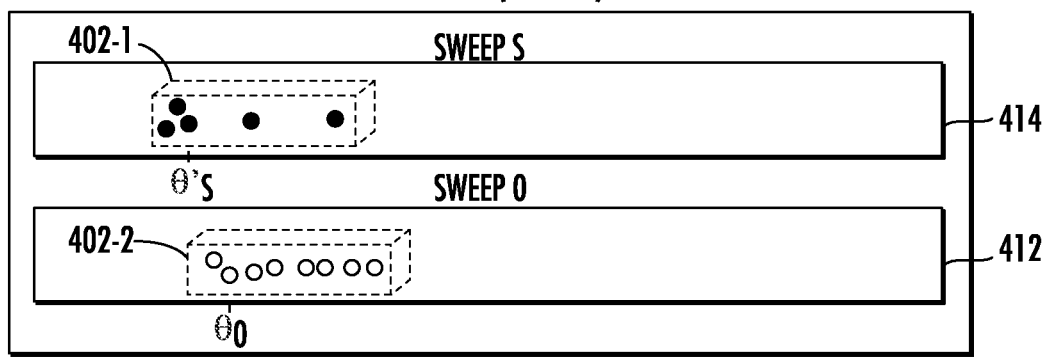

FIG. 4B depicts an example diagram illustrating sensor data presented in a range view presentation according to example embodiments of the present disclosure. In this example, the sensor data is displayed in a range view from the perspective of the autonomous vehicle (e.g., autonomous vehicle 402 in FIG. 4A). In this example, two different sensor sweeps (e.g., each sweep being a full revolution of the LIDAR sensor) are displayed. The first sweep 410 can represent a sensor sweep at a first time s and the second sweep can represent a second sweep at a second time 0.

In the first sweep 410, associated with the first time s, can include sensor data representing the object 402-1 at a first position. The second sweep, associated with the second time 0, can include sensor data representing the object 402-2 at a second position. The first sweep 410 and the second sweep 412 represent the captured sensor data from their original coordinate frame (e.g., the coordinate frame of the autonomous vehicle (e.g., autonomous vehicle 402 in FIG. 4A) at the time the sensor sweep data was captured).

The fusion system (e.g., fusion system 312 in FIG. 3) can convert sensor sweep data from a first coordinate frame (e.g., the coordinate frame of the autonomous vehicle when the sensor sweep was captured) to a second coordinate frame (e.g., the coordinate frame associated with the position of the autonomous vehicle at a later time).

In this example, the first sensor sweep 410 can be converted into the coordinate fame of the second sensor sweep 412. Thus, the movement of the object (e.g., object 404 from FIG. 4A) can be more accurately determined because it's position is in the same coordinate frame in the transformed view 414 of the first sensor sweep and the view of the second sensor seep 412 (which doesn't need to be transformed).

Figure 5A:
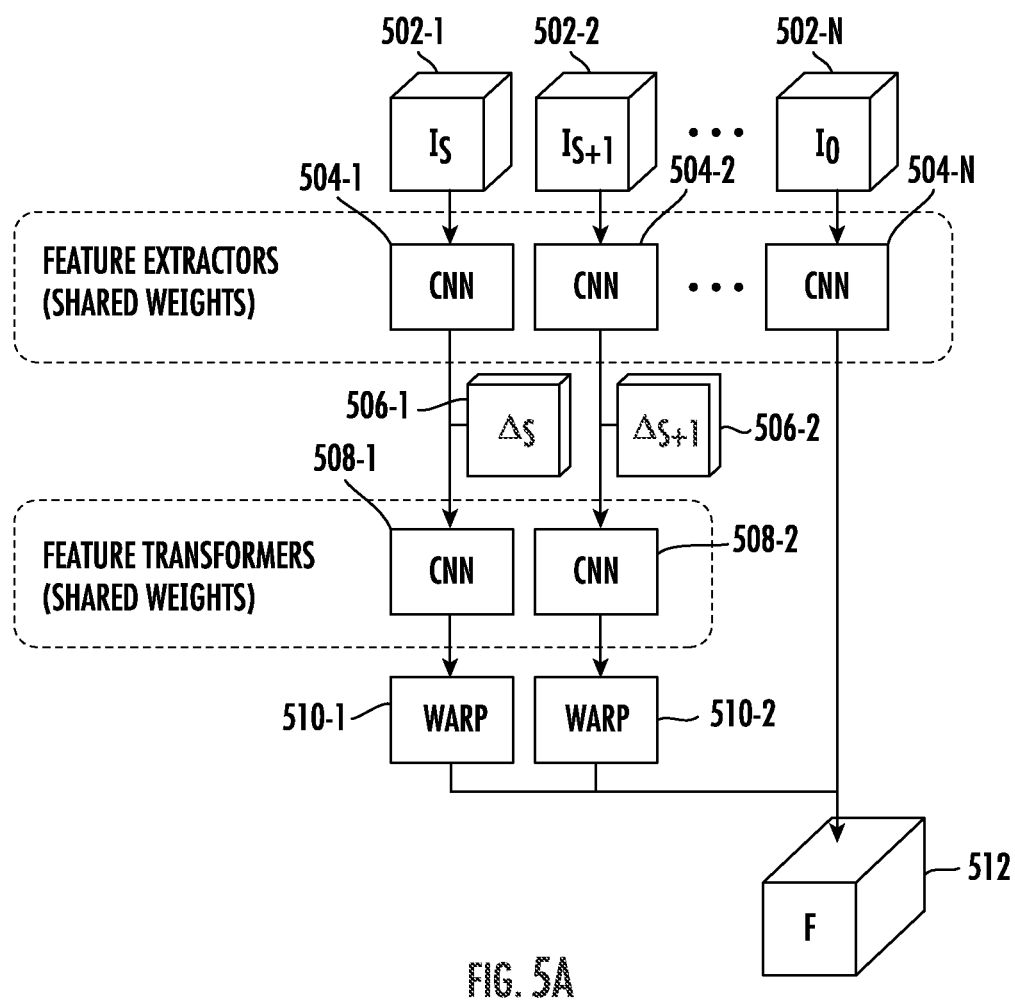
FIG. 5A depicts an example diagram illustrating a sweep fusion process according to example embodiments of the present disclosure.

FIG. 5A depicts an example diagram illustrating a sweep fusion process according to example embodiments of the present disclosure. In this example, the fusion system (e.g., fusion system 312 in FIG. 3) is performing a late fusion process. The fusion system can obtain a plurality of images (502-1 to 502-N). Each image (e.g., 502-1. 502-2, or 502-N) can represent a particular sensor sweep (e.g., a single revolution of a LIDAR sensor) from a plurality of consecutive sensor sweeps, starting from a point in the past, and including every sensor sweep up until the most recent sensor sweep.

Each sensor sweep can be used as input to a convolutional neural network (or multiple instances of the same convolutional neural network) 504-1 to 504-N. If multiple instances of a neural network are used (e.g., 504-1, 504-2, or 504-N), it can be important that each instance share the same weights and biases. Weights and biases can represent the strength of connections between various neural nodes (neurons) in the neural network. By using the same weights for all instances of the convolutional neural network (e.g., 504-1, 504-2, or 504-N), the fusion system (e.g., fusion system 312 in FIG. 3) can ensure that the same/like features can be extracted from each image and thus it will be easy to fuse them.

In this example, the fusion system (e.g., fusion system 312 in FIG. 3) can obtain, for each image (502-1 to 502-N), one or more features (e.g., edges, corners, blobs, and other low level features of the image) as the output of the convolutional neural network. The fusion system (e.g., fusion system 312 in FIG. 3) can gather movement data (506-1 and 506-2) for the autonomous vehicle (e.g., autonomous vehicle 105 in FIG. 1) which represents the movement of the autonomous vehicle (e.g., autonomous vehicle 105 in FIG. 1) from the first point in time associated with the first image (and its associated sensor sweep) and the most recent image (and its associated sensor sweep). The vehicle movement data 506-1 associated with a particular image 502-1 can represent the movement of the autonomous vehicle (e.g., autonomous vehicle 105 in FIG. 1) from its position when the sensor sweep associated with the image 502-1 was captured to its position in the target coordinate frame.

The vehicle movement data (506-1 and 506-2) and the output feature data can be passed to a second CNN. The second CNN 508-1 to 508-2 can transform the feature data from its current coordinate frame (e.g., the frame that is used to identify the location of one or more features in the sensor sweep) to a coordinate frame associated with the most recent sensor sweep (sometimes referred to as the current sensor sweep).

By transforming or warping (510-1 and 510-2) the feature data for all the images into the coordinate frame of the most recent sensor sweep, the fusion system (e.g., fusion system 312 in FIG. 3) can ensure that the movement of objects can be isolated from the movement of the autonomous vehicle (e.g., autonomous vehicle 105 in FIG. 1). The transformed feature data and/or images can be combined into a fused representation 512 of the sensor sweep data and transmitted to a prediction component of the vehicle computing system (e.g., vehicle computing system 110 in FIG. 1) which can identify one or more objects and, using the transformed data, determine the past movement of the objects. Using the past movement of the objects, the vehicle computing system (e.g., vehicle computing system 110 in FIG. 1) can predict the future movement of the objects.

Figure 5B:
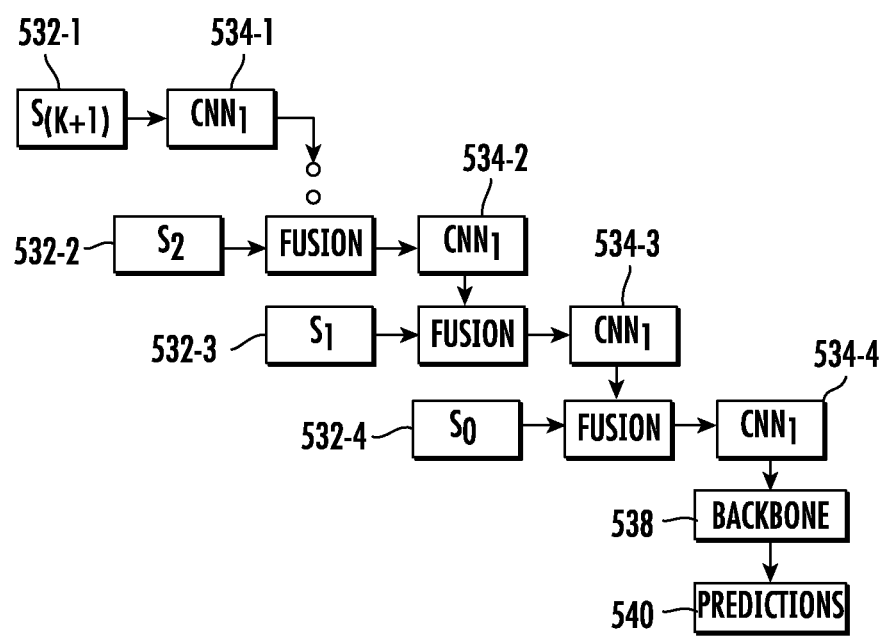
FIG. 5B depicts an example diagram illustrating a sweep fusion process according to example embodiments of the present disclosure.

FIG. 5B depicts an example diagram illustrating a sweep fusion process according to example embodiments of the present disclosure. In this example, the fusion system (e.g., fusion system 312 in FIG. 3) is performing an incremental process. In contrast to a late fusion process, during an incremental fusion process, the fusion system (e.g., fusion system 312 in FIG. 3) can transform the image/feature data for a particular sensor sweep into the coordinate frame of the subsequent sensor sweep.

Thus sensor sweep data for a first sensor sweep 532-1 can be inputted to a convolutional neural network (CNN) 534-1. The CNN 534-1 can extract feature data and transform the feature data into the coordinate frame of a second sensor sweep 532-2. The first sensor sweep data and the second sensor sweep data can then be fused. The resultant fused data can be used as input to another instantiation of the CNN 534-2. This process can be repeated until data from each of the sensor sweeps in the plurality of sensor sweeps (532-1, 532-2, 532-3, 532-4) has been fused. This fused data can be stored as detection data in the backbone data structure 538. The prediction process 540 can use the data in the backbone data structure to identify objects and predict the movement of the objects in the future.

Figure 6:
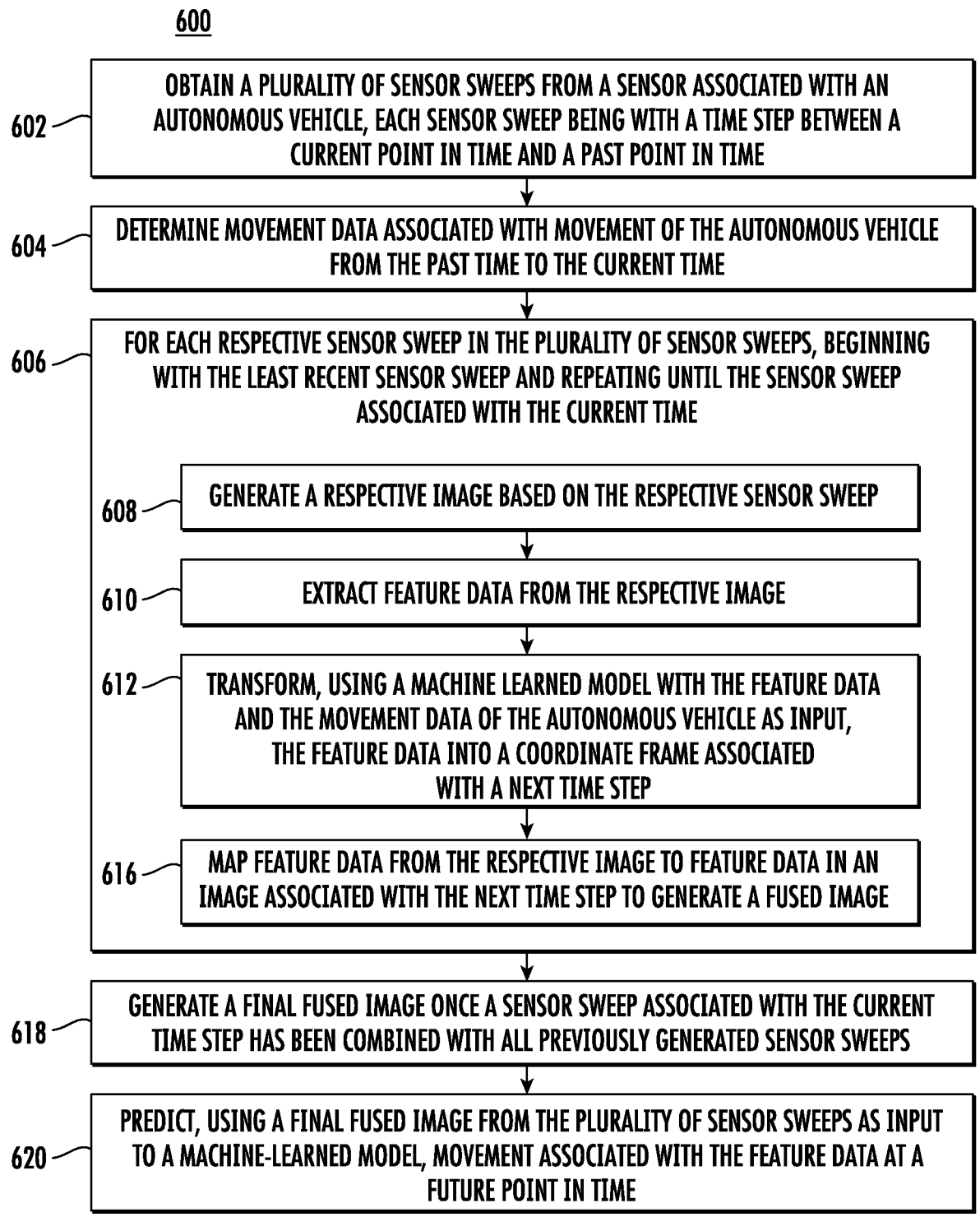
FIG. 6 depicts a flow chart diagram of an example method for improving the detection and prediction processes of an autonomous vehicle according to example embodiments of the present disclosure.
Figure 7:
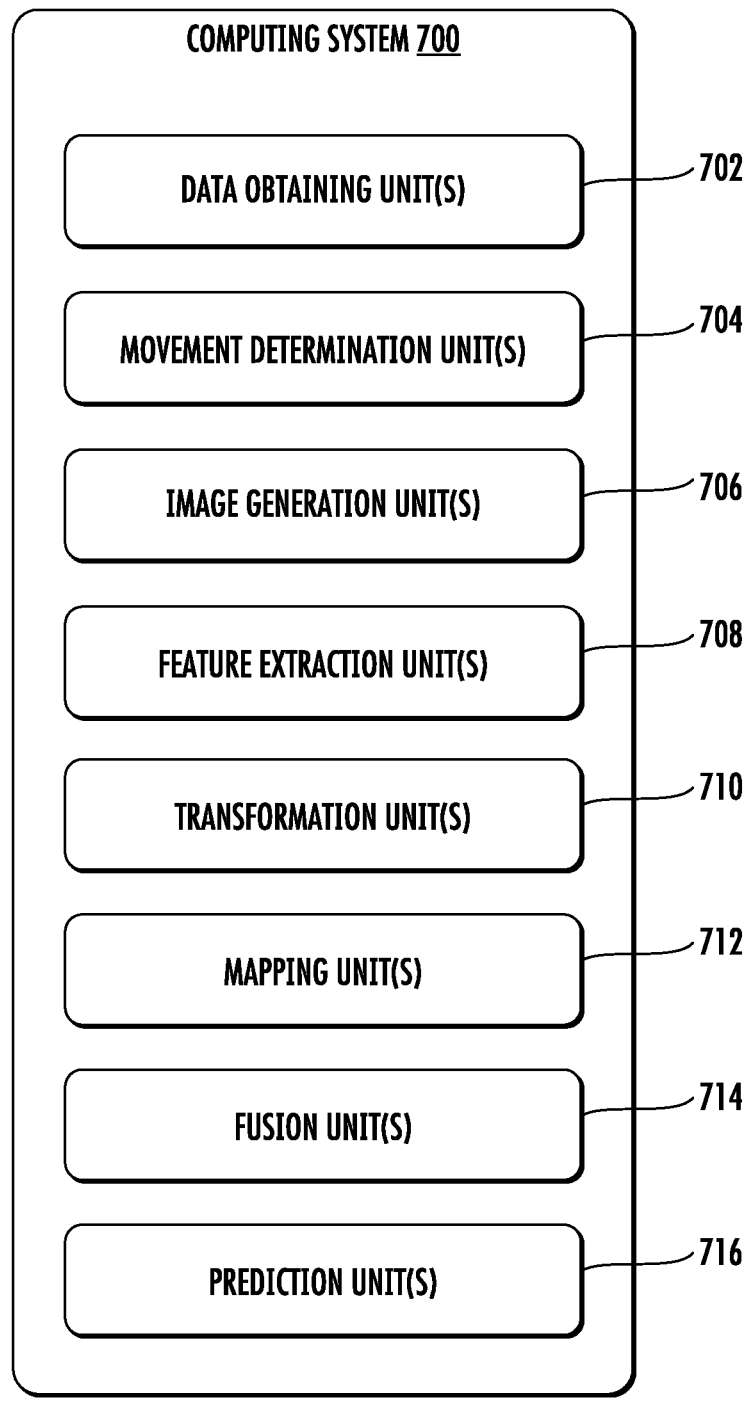
FIG. 7 depicts an example system with units for performing operations and functions according to example aspects of the present disclosure.

FIG. 6 depicts a flow chart diagram of an example method 600 for improving the detection and prediction processes of an autonomous vehicle (e.g., autonomous vehicle 105 in FIG. 1) according to example embodiments of the present disclosure. One or more portions of method can be implemented by one or more computing devices such as, for example, a computing device associated with the fusion system (e.g., fusion system 312 of FIG. 3). One or more portions of the method 600 described herein can be implemented as an algorithm on the hardware components of the devices described herein (e.g., as in FIGS. 1-3, 7, and 8) to, for example, provide improved motion planning by improving detection and prediction. Although FIG. 6 depicts steps performed in a particular order for purposes of illustration and discussion, method 600 of FIG. 6 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

An autonomous vehicle (e.g., autonomous vehicle 105 in FIG. 1) can include a vehicle computing system (e.g., vehicle computing system 110 in FIG. 1). The vehicle computing system (e.g., vehicle computing system 110 in FIG. 1) can, at 602, obtain a plurality of sensor sweeps from a sensor associated with an autonomous vehicle, each sensor sweep being with a time step between a current point in time and a past point in time. In some examples, the sensor sweep can include sensor data. The sensor data can be point cloud data collected by a LIDAR sensor.

In some examples, each sweep in the plurality of sweeps represents a complete revolution of the LIDAR sensor. For example, a LIDAR sensor can continuously rotate and as it rotates take measurements of the area around the autonomous vehicle by projecting lasers and detecting when they reflect back. The vehicle computing system (e.g., vehicle computing system 110 in FIG. 1) can slice that continuous data up into discrete revolutions, each revolution having an associated position and time. The sliced-up sensor data associated with a particular revolution can be referred to as a sensor sweep. In some examples, each point in the point cloud data has an associated luminance value.

In some examples, each sensor sweep can have an associated coordinate frame, the coordinate frame being based on the position of the vehicle computing system (e.g., vehicle computing system 110 in FIG. 1). For example, if the coordinate frame is a Cartesian plane, the dimensions can be determined based on the position and pose of the autonomous vehicle. Thus, the position of the autonomous vehicle (e.g., autonomous vehicle 105 in FIG. 1) can represent $\{0, 0\}$ in the autonomous vehicle (e.g., autonomous vehicle 105 in FIG. 1) coordinate frame with the positive values on the y-axis representing the space in front of the autonomous vehicle (e.g., autonomous vehicle 105 in FIG. 1) and the negative values representing the space behind the autonomous vehicle (e.g., autonomous vehicle 105 in FIG. 1). Similarly, the x-axis can represent left and right of the autonomous vehicle (e.g., autonomous vehicle 105 in FIG. 1), respectively. Thus, the coordinate frame associated with each sensor sweep can be based on a location of the autonomous vehicle (e.g., autonomous vehicle 105 in FIG. 1) when the sensor data associated with the sweep was captured.

The vehicle computing system (e.g., vehicle computing system 110 in FIG. 1) can, at 604, determine movement data associated with movement of the autonomous vehicle (e.g., autonomous vehicle 105 in FIG. 1) from the past point in time to the current point in time. For example, the vehicle computing system (e.g., vehicle computing system 110 in FIG. 1) can determine the position of the autonomous vehicle at each step based on a set of coordinates independent of the autonomous vehicle (e.g., latitude/longitude). In other examples, the movement of the vehicle computing system (e.g., vehicle computing system 110 in FIG. 1) can be represented as a change from the previous time step. Thus, the movement can be represented by a direction and a distance.

For each respective sensor sweep in the plurality of sensor sweeps and beginning with the least recent sensor sweep in the plurality of sensor sweeps and repeating with each subsequent sensor sweep until the most recent sensor sweep, the vehicle computing system (e.g., vehicle computing system 110 in FIG. 1) can, at 608, generate, based on the respective sensor sweep, a respective image associated with the respective sensor sweep, the image comprising sensor data included in the respective sensor sweep arranged in a two-dimensional representation of the three-dimensional sensor data.

For example, the vehicle computing system (e.g., vehicle computing system 110 in FIG. 1) can project each point in the point cloud data onto a two-dimensional image. The row of the image can be determined based on the elevation angle associated with the point or a specific laser identification associated with the point (e.g., for LIDAR systems with multiple lasers that measure objects at different heights). The column positioning of the point can be based on the azimuth angle of the LIDAR sensor at the time the point was measured. In some examples, the respective image is generated based, at least in part, on the luminance values associated with the points in the point cloud data.

In some examples, while performing an incremental fusion process, the vehicle computing system (e.g., vehicle computing system 110 in FIG. 1) can combine the respective image with mapped feature data associated with the previous sensor sweep. In this way, the extracted features of each sensor sweep can be transformed into the coordinate frame of the next sensor sweep and fused into the next frame image at each step. This can result in less overall distortion than would be introduced by shifting sensor sweeps into the current coordinate frame directly.

The vehicle computing system (e.g., vehicle computing system 110 in FIG. 1) can, at 610, extract feature data from the respective image. Feature data can include low level image components such as lines, edges, shapes, and so on. In some examples, the feature data is extracted using one or more machine-learned models with the respective images as input. In some examples, the one or more machine-learned models can be convolutional neural networks. The weights associated with the machine-learned models can be shared for all the machine-learned models used to extract feature data from the plurality of images. In this way, the vehicle computing system (e.g., vehicle computing system 110 in FIG. 1) can improve the likelihood of extracting similar features from each image, which makes it easier to fuse them later in the process.

The vehicle computing system (e.g., vehicle computing system 110 in FIG. 1) can, at 612, transform the feature data into a coordinate frame associated with a next time step using the feature data and the movement data associated with the autonomous vehicle. In some examples, the transformation can be performed, at least in part, using one or more machine-learned models. In this way, the current image and its associated feature data can be put in the same coordinate frame of reference as the image associated with either the next sensor sweep (for incremental fusion) or the most recent sensor sweep (for late fusion). Doing so isolates the motion of the autonomous vehicle (e.g., autonomous vehicle 105 in FIG. 1) from the motion of the other objects in the area and allows the vehicle computing system (e.g., vehicle computing system 110 in FIG. 1) to identify the motion of each object.

The vehicle computing system (e.g., vehicle computing system 110 in FIG. 1) can, at 616, map each point from the respective image to feature data in an image associated with the next time step to generate a fused image. In some examples, the vehicle computing system (e.g., vehicle computing system 110 in FIG. 1) can perform a late fusion process and map the points from the respective image to the image associated with the most recent time step. Once each image associated with the plurality of times steps has been mapped to the image of the most recent time step, the vehicle computing system (e.g., vehicle computing system 110 in FIG. 1) can generate a fused image.

While performing an incremental fusion process, the vehicle computing system (e.g., vehicle computing system 110 in FIG. 1) can process each sensor sweep sequentially with the order of processing strictly controlled based on the order in which they were obtained, with each sensor sweep being processed and combined with the next sensor sweep before the next sensor sweep is fully processed. In contrast, while performing a late fusion process, the vehicle computing system (e.g., vehicle computing system 110 in FIG. 1) can process the sensor sweeps concurrently. In this case, concurrently processing the sensor sweeps can involve processing the sensor sweeps simultaneously or alternatively, concurrently processing can involve processing them in an overlapping fashion in which the order in which the processing occurs is not necessarily strictly enforced.

The vehicle computing system (e.g., vehicle computing system 110 in FIG. 1) can, at 618, generate a final fused representation of the plurality of sensors sweeps once a sensor sweep associated with the current time step has been combined with all previously generated sensor sweeps. The final fused representation of the plurality of sensors sweeps can use the coordinate frame of the current sensor sweep. The vehicle computing system (e.g., vehicle computing system 110 in FIG. 1) can identify one or more objects in the feature data. The vehicle computing system (e.g., vehicle computing system 110 in FIG. 1) can determine past movement for the one or more objects based on the mapped feature data.

The vehicle computing system (e.g., vehicle computing system 110 in FIG. 1) can, at 620, predict based, at least in part, on the final fused representation of the plurality of sensors sweeps from the plurality of sensor sweeps, movement associated with the feature data at a future point in time. In some examples, this prediction can be the output of one or more machine-learned models. For example, the vehicle computing system (e.g., vehicle computing system 110 in FIG. 1) can determine a predicted position for the one or more objects at one or more time steps in the future.

Various means can be configured to perform the methods and processes described herein. For example, a vehicle computing system (e.g., vehicle computing system 110 in FIG. 1) can include data obtaining units(s) 702, movement determination units(s) 704, image generation units(s) 706, feature extraction unit(s) 708, transformation unit(s) 710, mapping unit(s) 712, fusion unit(s) 714, prediction unit(s) 716, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain a plurality of sensor sweeps from a sensor associated with an autonomous vehicle (e.g., autonomous vehicle 105 in FIG. 1), each sensor sweep being with a time step between a current point in time and a past point in time. For example, a vehicle computing system (e.g., vehicle computing system 110 in FIG. 1) can receive sensor data from a LIDAR sensor in the form of a point cloud. A data obtaining unit 702 is one example of a means for obtaining a plurality of sensor sweeps from a sensor associated with an autonomous vehicle (e.g., autonomous vehicle 105 in FIG. 1), each sensor sweep being with a time step between a current point in time and a past point in time.

The means can be configured to determine movement data associated with movement of the autonomous vehicle (e.g., autonomous vehicle 105 in FIG. 1) from the past point in time to the current point in time. For example, a location determining system (e.g., a GPS) can track the position of the autonomous vehicle (e.g., autonomous vehicle 105 in FIG. 1) and periodically store the location of the autonomous vehicle (e.g., autonomous vehicle 105 in FIG. 1). A movement detection unit 704 is one example of a means for determining movement data associated with movement of the autonomous vehicle (e.g., autonomous vehicle 105 in FIG. 1) from the past point in time to the current point in time.

The means can be configured to generate, based on the respective sensor sweep, a respective image associated with the respective sensor sweep, the image comprising sensor data included in the respective sensor sweep arranged in a two-dimensional representation of the three-dimensional sensor data. For example, the vehicle computing system (e.g., vehicle computing system 110 in FIG. 1) can project each point in the point cloud data onto a two-dimensional image based on the elevation angle and azimuth angle associated with the point. An image generation unit 706 is one example of a means for generating, based on the respective sensor sweep, a respective image associated with the respective sensor sweep, the image comprising sensor data included in the respective sensor sweep arranged in a two-dimensional representation of the three-dimensional sensor data.

The means can be configured to extract, using the respective image as input to one or more machine-learned models, feature data from the respective image. For example, the vehicle computing system (e.g., vehicle computing system 110 in FIG. 1) can identify low-level image features such as lines, edges, blobs, and corners. A feature extraction unit 708 is one example of a means for extracting, using the respective image as input to one or more machine-learned models, feature data from the respective image.

The means can be configured to transform, using a machine learned model with the feature data and the movement data of the autonomous vehicle (e.g., autonomous vehicle 105 in FIG. 1) as input, the feature data into a coordinate frame associated with a next time step. For example, the autonomous vehicle (e.g., autonomous vehicle 105 in FIG. 1) can determine where the features of the respective image would have appeared had the LIDAR system been positioned at the same place as the next time step when the measurement was taken. A transformation unit 710 is one example of a means for transforming, using a machine learned model with the feature data and the movement data of the autonomous vehicle as input, the feature data into a coordinate frame associated with a next time step.

The means can be configured to map each point from the respective image to the image associated with the next time step to generate a fused image. For example, the vehicle computing system (e.g., vehicle computing system 110 in FIG. 1) can determine the location for each point in the current image in an image associated with the new coordinate frame. A mapping unit 712 is one example of a means for mapping each point from the respective image to the image associated with the next time step to generate a fused image.

The means can be configured to generate a final fused representation of the plurality of sensors sweeps once a sensor sweep associated with the current time step has been combined with all previously generated sensor sweeps. For example, the vehicle computing system (e.g., vehicle computing system 110 in FIG. 1) can generate a plurality of mappings of each sensor sweep into the coordinate frame of the most recent sensor sweep by fusing each image into the image associated with the subsequent time step. Once all sensor sweeps have been fused, the product can be a final fused representation of the plurality of sensors sweeps that has all sensor sweep data in the coordinate frame of the most recent sensor sweep. A fusion unit 714 is one example of a means for generating a final fused representation of the plurality of sensors sweeps once a sensor sweep associated with the current time step has been combined with all previously generated sensor sweeps.

The means can be configured to predict, using the final fused representation of the plurality of sensors sweeps from the plurality of sensor sweeps as input to a machine-learned model, movement associated with the feature data at a future point in time. For example, the vehicle computing system (e.g., vehicle computing system 110 in FIG. 1) can, for each feature or detected object, generate a predicted trajectory or a statistical distribution of possible trajectories based on the final fused image, which can be used to determine the past movement of the object, among other data. A prediction unit 716 is one example of a means for predicting, using the final fused representation of the plurality of sensors sweeps from the plurality of sensor sweeps as input to a machine-learned model, movement associated with the feature data at a future point in time.

Figure 8:
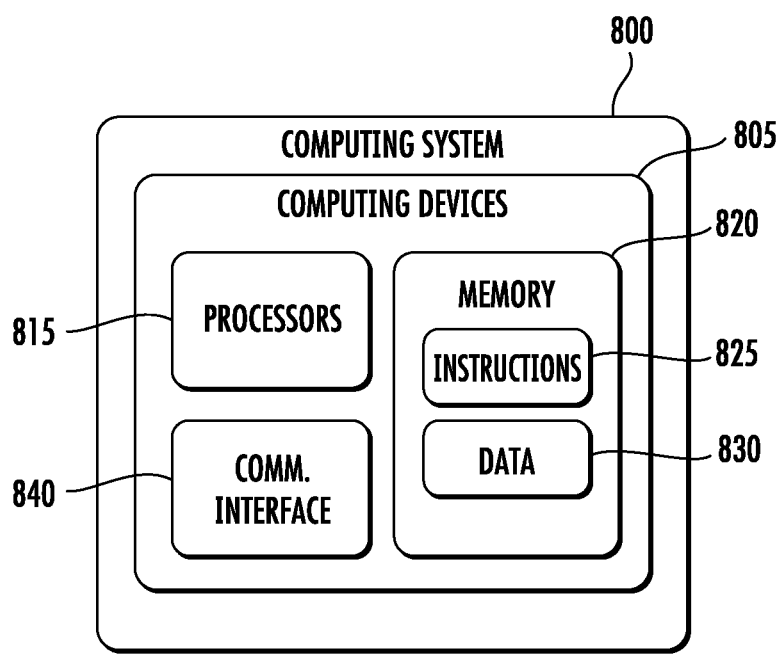
FIG. 8 depicts example system components according to example aspects of the present disclosure.

FIG. 8 depicts example system components according to example aspects of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The computing system 800 can be and/or include the vehicle computing system 110 of FIG. 1 or fusion system 312 of FIG. 3. The computing system 800 can be associated with an operations system and/or an entity associated with the vehicle 105 such as, for example, a vehicle owner, vehicle manager, fleet operator, service provider, etc.

The computing device(s) 805 of the computing system 800 can include processor(s) 815 and at least one memory 820. The one or more processors 815 can be any suitable processing device (e.g., a processor core, a microprocessor, an ASIC, an FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, magnetic disks, data registers, etc., and combinations thereof.

The memory 820 can store information that can be accessed by the one or more processors 815. For instance, the memory 820 (e.g., one or more non-transitory computer-readable storage mediums, memory devices) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815

For example, the memory 820 on-board the vehicle 105 can store instructions 825 that when executed by the one or more processors 815 cause the one or more processors 815 (e.g., in the vehicle computing system 110) to perform operations such as any of the operations and functions of the computing device(s) 805 and/or vehicle computing system 110 (and its subsystems (e.g., the perception, prediction, motion planner systems, etc.)), any of the operations and functions for which the vehicle computing system 110 (and/or its subsystems) are configured, any portions of the methods described herein, and/or any other operations and functions described herein. Memory for a system offboard a vehicle can store instructions to perform any operations and functions of the offboard systems described herein and/or the operations and functions of the autonomous vehicle (its computing system), methods, and/or any other operations and functions described herein.

The memory 820 can store data 830 that can be obtained (e.g., received, accessed, written, manipulated, created, generated, etc.) and/or stored. The data 830 can include, for instance, services data (e.g., trip data, route data, user data, etc.), sensor data, map data, perception data, prediction data, sensor sweep data, vehicle movement data, coordinate frame data, fusion data, feature data, and/or other data/information as described herein. In some implementations, the computing device(s) 805 can obtain data from one or more memories that are remote from the autonomous vehicle 105.

The computing device(s) 805 can also include a communication interface 840 used to communicate with one or more other system(s) (e.g., the remote computing system). The communication interface 840 can include any circuits, components, software, etc. for communicating via one or more networks (e.g., network(s)). In some implementations, the communication interface 840 can include, for example, one or more of: a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for predicting motion of objects, the method comprising:
    obtaining, by a computing system with one or more processors, a plurality of sensor sweeps from a sensor associated with an autonomous vehicle, each sensor sweep being associated with a time step between a current point in time and a past point in time;
    determining, by the computing system, movement data associated with movement of the autonomous vehicle from the past point in time to the current point in time;
    for each respective sensor sweep in the plurality of sensor sweeps, beginning with the least recent sensor sweep in the plurality of sensor sweeps and repeating with each subsequent sensor sweep until the most recent sensor sweep:
        generating, by the computing system and based on the respective sensor sweep, a respective range view image associated with the respective sensor sweep, the respective range view image comprising sensor data included in the respective sensor sweep arranged in a two-dimensional representation;
        extracting, by the computing system using the respective range view image as input to one or more machine-learned models, feature data from the respective image;
        transforming, by the computing system, the feature data into a coordinate frame associated with a next time step; and
        mapping, by the computing system, each point from the respective range view image to the range-view image associated with the next time step to generate a fused image;
    generating, by the computing system, a final fused representation of the plurality of sensors sweeps once a sensor sweep associated with the current time step has been combined with all previously generated sensor sweeps;
    predicting, by the computing system based, at least in part, on the final fused representation of the plurality of sensors sweeps, movement associated with the feature data at one or more future time steps; and
    controlling, by the computing system, an autonomous vehicle, based at least in part, the predicted movement associated with the feature data at one or more future time steps.

2. The computer-implemented method of claim 1, wherein the sensor data is point cloud data collected by a LIDAR sensor.

3. The computer-implemented method of claim 2, wherein generating, by the computing system, a respective range view image, the respective range view image comprising sensor data included in the respective sensor sweep arranged in a two-dimensional representation further comprises:
    for each point in the point cloud data, determining, by the computing system, a position in the range view image that corresponds to a three-dimensional position of the point in the point cloud data.

4. The computer-implemented method of claim 2, wherein each sweep in the plurality of sweeps represents a complete revolution of the LIDAR sensor.

5. The computer-implemented method of claim 2, wherein each point in the point cloud data has an associated luminance value.

6. The computer-implemented method of claim 5, wherein the respective image is generated based, at least in part, on the luminance values associated with the points in the point cloud data.

7. The computer-implemented method of claim 1, wherein each sensor sweep has an associated coordinate frame.

8. The computer-implemented method of claim 7, wherein the coordinate frame associated with each sensor sweep is based on a location of the autonomous vehicle when the sensor data associated with the sweep was captured.

9. The computer-implemented method of claim 1, wherein predicting, by the computing system based, at least in part, on the final fused representation of the plurality of sensors sweeps, movement associated with the feature data at one or more future time steps further comprises:
    identifying, by the computing system, one or more objects in the feature data; and
    determining, by the computing system, past movement for the one or more objects based on the final fused representation of the plurality of sensors sweeps.

10. The computer-implemented method of claim 9, wherein predicting, by the computing system based, at least in part, on the final fused representation of the plurality of sensors sweeps, movement associated with the feature data at one or more future time steps further comprises:
   determining, by the computing system, a predicted position for the one or more objects at one or more future time steps.

11. The computer-implemented method of claim 1, wherein the final fused representation of the plurality of sensors sweeps uses the coordinate frame of the current sensor sweep.

12. The computer-implemented method of claim 1, wherein the one or more machine-learned models are convolutional neural networks.

13. The computer-implemented method of claim 1, further comprising, prior to extracting, by the computing system, feature data from the respective range view image, concatenating the respective range view image with mapped feature data associated with the previous sensor sweep.

14. An autonomous vehicle, comprising:
   one or more processors; and
   one or more non-transitory computer-readable media that collectively store instructions that, when executed by the one or more processors, cause the one or more processors to perform operations, the operations comprising:
      obtaining a plurality of sensor sweeps from a sensor associated with the autonomous vehicle, each sensor sweep representing a time step between a current point in time and a past point in time;
      determining movement data associated with movement of the autonomous vehicle from the past time to the current time;
      for each respective sensor sweep in the plurality of sensor sweeps, beginning with the least recent sensor sweep and repeating until the sensor sweep associated with the current time:
         generating a respective image, the respective image comprising sensor data included in the respective sensor sweep arranged in a two-dimensional representation;
         extracting feature data using the respective image as input to one or more machine-learned models, feature data from the respective image;
         transforming the feature data into a coordinate frame associated with a next time step; and
         mapping each point from the respective image to the image associated with the next time step to generate a fused image;
      generating a final fused representation of the plurality of sensors sweeps once a sensor sweep associated with the current time step has been combined with all previously generated sensor sweeps;
      predicting, based, at least in part, on the final fused representation of the plurality of sensors sweeps from the plurality of sensor sweeps, movement associated with the feature data one or more future time steps; and
      controlling, by the computing system, an autonomous vehicle, based at least in part, the predicted movement associated with the feature data at one or more future time steps.

15. The autonomous vehicle of claim 14, wherein predicting, using mapped feature data from the plurality of sensor sweeps as input to a machine-learned model, movement associated with the feature data at a future point in time further comprises:
   identifying one or more objects in the feature data; and
   determining past movement for the one or more objects based on the mapped feature data.

16. The autonomous vehicle of claim 15, wherein predicting, using mapped feature data from the plurality of sensor sweeps as input to a machine-learned model, movement associated with the feature data at a future point in time further comprises:
   determining a predicted position for the one or more objects at one or more time steps in the future.

17. The autonomous vehicle of claim 14, wherein the final fused representation of the plurality of sensors sweeps uses the coordinate frame of the current sensor sweep.

18. A computer-implemented method for predicting motion of objects, the method comprising:
   obtaining, by a computing system with one or more processors, a plurality of sensor sweeps from a sensor associated with an autonomous vehicle, each sensor sweep representing a particular time step between a current point in time and a past point in time;
   determining, by the computing system, movement data associated with movement of the autonomous vehicle from the past time to the current time;
   concurrently, for each respective sensor sweep in the plurality of sensor sweeps:
      generating, by the computing system, a respective image, the respective image comprising sensor data associated with the respective sensor sweep arranged in a two-dimensional representation;
      extracting, by the computing system using one or more first machine-learned models, feature data from the respective image;
      transforming, by the computing system using one or more second machine-learned models with the feature data and the movement data of the autonomous vehicle as input, the feature data into a current coordinate frame associated with the current point in time; and
      mapping, by the computing system, each point from the respective image to the image associated with the most recent sensor sweep;
   generating, by the computing system, a fused image by combining the images for each of the sensor sweeps;
   predicting, by the computing system based, at least in part, on the fused image from the plurality of sensor sweeps, movement associated with the feature data at one or future more time steps; and
   controlling, by the computing system, an autonomous vehicle, based at least in part, the predicted movement associated with the feature data at one or more future time steps.

19. The computer-implemented method of claim 18, wherein the one or more first machine-learned models and the one or more second machine-learned models are convolutional neural networks.

20. The computer-implemented method of claim 18, wherein the one or more first machine-learned models have the same weights.

* * * * *